United States Patent
Nguyen et al.

(10) Patent No.: US 11,499,644 B2
(45) Date of Patent: Nov. 15, 2022

(54) SEALING ASSEMBLY FOR A KNIFE GATE VALVE

(71) Applicant: Emerson Automation Solutions Final Control US LP, Houston, TX (US)

(72) Inventors: Kenneth Nguyen, Reno, NV (US); Peter Woodhead, Brisbane (AU); Viet Nguyen, Reno, NV (US)

(73) Assignee: Emerson Automation Solutions Final Control US LP, Houston, TX (US)

( * ) Notice: Subject to any disclaimer, the term of this patent is extended or adjusted under 35 U.S.C. 154(b) by 148 days.

(21) Appl. No.: 17/001,921

(22) Filed: Aug. 25, 2020

(65) Prior Publication Data

US 2022/0065354 A1 Mar. 3, 2022

(51) Int. Cl.
*F16K 3/02* (2006.01)
*F16K 25/00* (2006.01)
*F16K 27/04* (2006.01)

(52) U.S. Cl.
CPC .......... *F16K 3/0281* (2013.01); *F16K 3/0227* (2013.01); *F16K 25/00* (2013.01); *F16K 27/044* (2013.01)

(58) Field of Classification Search
CPC ...... F16K 3/0227; F16K 3/0281; F16K 25/00; F16K 27/044
USPC ........................................................ 251/327
See application file for complete search history.

(56) References Cited

U.S. PATENT DOCUMENTS

| | | |
|---|---|---|
| 1,612,039 A | 12/1926 | Miller |
| 1,868,147 A | 7/1932 | Kruse |
| 2,669,416 A | 2/1954 | Hilton |
| 2,731,282 A | 1/1956 | McNamus et al. |
| 2,774,371 A | 12/1956 | Grtannenfelt |
| 2,829,862 A | 4/1958 | Wey |
| 2,842,283 A | 7/1958 | Smith |
| 2,992,817 A | 7/1961 | Templeton |
| 3,319,661 A | 5/1967 | Shindler |
| 3,333,816 A | 8/1967 | Williams et al. |
| 3,475,004 A | 10/1969 | Jennings |
| 3,589,670 A | 6/1971 | Armtrong |
| 3,685,580 A | 8/1972 | DeVries |
| 3,710,816 A | 1/1973 | Prince |
| 3,711,062 A | 1/1973 | Kirkwood |
| 3,743,244 A | 7/1973 | Dickenson et al. |
| 3,746,303 A | 7/1973 | Grove et al. |
| 3,765,647 A | 10/1973 | Grove et al. |

(Continued)

FOREIGN PATENT DOCUMENTS

| | | |
|---|---|---|
| CA | 1086706 A | 9/1980 |
| CA | 1227473 A | 9/1987 |

(Continued)

*Primary Examiner* — Kevin F Murphy
*Assistant Examiner* — Jonathan J Waddy
(74) *Attorney, Agent, or Firm* — Quarles & Brady LLP

(57) ABSTRACT

Embodiments of the invention provide a knife gate valve for flow along a flow path. The knife gate valve can include a body structure that includes a gate passage, a gate disposed to move within the gate passage between open and closed positions to selectively open or close a fluid aperture, and a gate seat configured to engage a free end and lateral edges of the gate. A transverse element can be formed from resilient material and can extend laterally across the gate passage to form a seal with a first side of the gate and with the gate seat.

18 Claims, 16 Drawing Sheets

(56) References Cited

U.S. PATENT DOCUMENTS

| | | |
|---|---|---|
| 3,768,774 A | 10/1973 | Baugh |
| 3,799,187 A | 3/1974 | Armstrong |
| 3,896,834 A | 7/1975 | Paul, Jr. |
| 3,906,992 A | 9/1975 | Leach |
| 3,917,223 A | 11/1975 | Sidler et al. |
| 3,938,779 A | 2/1976 | Benjamin |
| 3,993,092 A | 11/1976 | Still |
| 4,009,727 A | 3/1977 | Bailey |
| 4,026,001 A | 5/1977 | Jones |
| 4,026,517 A | 5/1977 | Still |
| 4,031,930 A | 6/1977 | Sutcliffe et al. |
| 4,102,175 A | 7/1978 | Foster |
| 4,146,989 A | 4/1979 | Vanus et al. |
| 4,206,905 A | 6/1980 | Dobler |
| 4,230,299 A | 10/1980 | Pierce, Jr. |
| 4,239,469 A | 12/1980 | Kemp |
| 4,279,402 A | 7/1981 | Wey et al. |
| 4,314,579 A | 2/1982 | Wheatley et al. |
| 4,364,542 A | 12/1982 | Meyer |
| 4,377,274 A | 3/1983 | Mayhew, Jr. |
| 4,429,710 A | 2/1984 | Grieves et al. |
| 4,434,967 A | 3/1984 | Vanderburg |
| 4,441,726 A | 4/1984 | Uhl |
| 4,451,047 A | 5/1984 | Herd et al. |
| 4,516,752 A | 5/1985 | Babbitt et al. |
| 4,516,921 A | 5/1985 | Kemp |
| 4,522,224 A | 6/1985 | Stalder et al. |
| 4,524,950 A | 6/1985 | Vitas et al. |
| 4,546,788 A | 10/1985 | Stalder et al. |
| 4,552,369 A | 11/1985 | Stewart et al. |
| 4,558,669 A | 12/1985 | Kemp |
| 4,583,569 A | 4/1986 | Ahistone |
| 4,603,864 A | 8/1986 | Raftis |
| 4,646,407 A | 3/1987 | Mayhew, Jr. |
| 4,646,777 A | 3/1987 | Stalder et al. |
| 4,664,139 A | 5/1987 | Pfeiffer |
| 4,679,770 A | 7/1987 | Liberman |
| 4,681,329 A | 7/1987 | Contin |
| 4,703,915 A | 11/1987 | King |
| 4,718,637 A | 1/1988 | Contin |
| 4,730,807 A | 3/1988 | Miller |
| 4,742,990 A | 5/1988 | Stalder et al. |
| 4,765,361 A | 8/1988 | Clifford |
| 4,773,440 A | 9/1988 | Yanagawa et al. |
| 4,773,627 A | 9/1988 | King et al. |
| 4,776,564 A | 10/1988 | Westenberg |
| 4,798,365 A | 1/1989 | Mayhew |
| 4,860,704 A | 8/1989 | Slaughter |
| 4,881,719 A | 11/1989 | Bowman |
| 4,886,241 A | 12/1989 | Davis et al. |
| 4,895,181 A | 1/1990 | McKavanagh |
| 4,949,939 A | 8/1990 | Almada |
| 5,013,009 A | 5/1991 | Nelson |
| 5,014,730 A | 5/1991 | Fye |
| 5,020,776 A | 6/1991 | Owens et al. |
| 5,029,812 A | 7/1991 | Haynes |
| 5,037,064 A | 8/1991 | Pond |
| 5,056,758 A | 10/1991 | Bramblet |
| 5,062,439 A | 11/1991 | Butler et al. |
| 5,062,857 A | 11/1991 | Berringer et al. |
| 5,082,247 A | 1/1992 | Owens et al. |
| 5,137,261 A | 8/1992 | Clifford |
| 5,150,881 A | 9/1992 | McKavanagh |
| 5,154,397 A | 10/1992 | Thomas et al. |
| 5,178,180 A | 1/1993 | Parris et al. |
| 5,192,051 A | 3/1993 | Roberson |
| 5,197,512 A | 3/1993 | Lev |
| 5,205,317 A | 4/1993 | Neuerberg et al. |
| 5,205,537 A | 4/1993 | Pfeiffer |
| 5,236,345 A | 8/1993 | Nevrekar |
| 5,244,183 A | 9/1993 | Calvin et al. |
| 5,255,893 A | 10/1993 | Peterson |
| 5,271,426 A | 12/1993 | Clarkson et al. |
| 5,291,912 A | 3/1994 | Comeaux |
| 5,295,659 A | 3/1994 | Steele |
| 5,295,661 A | 3/1994 | Roussel |
| 5,297,777 A | 3/1994 | Yie |
| 5,338,006 A | 8/1994 | McCutcheon et al. |
| 5,341,835 A | 8/1994 | Lanning, II |
| 5,368,276 A | 11/1994 | Pfeiffer |
| 5,375,812 A | 12/1994 | Kent |
| 5,413,140 A | 5/1995 | Kimpel et al. |
| 5,549,278 A | 8/1996 | Sidler |
| 5,653,423 A | 8/1997 | Young et al. |
| 5,662,308 A | 9/1997 | Nevrekar |
| 5,727,775 A | 3/1998 | Rodger et al. |
| 5,836,569 A | 11/1998 | Wurangian |
| 5,890,700 A | 4/1999 | Clarkson et al. |
| 5,908,044 A | 6/1999 | Kearns et al. |
| 5,908,046 A | 6/1999 | Mosman |
| 5,979,874 A | 11/1999 | Gambetta et al. |
| 6,010,112 A | 1/2000 | Sidler |
| 6,010,115 A | 1/2000 | Schlegel et al. |
| 6,116,573 A | 9/2000 | Cornette et al. |
| 6,279,875 B1 | 8/2001 | Chatufale |
| 6,375,157 B1 | 4/2002 | Van de Lande |
| 6,422,535 B1 | 7/2002 | Stone |
| 6,425,410 B1 | 7/2002 | Taylor |
| 6,588,729 B1 | 7/2003 | Kimpel |
| 6,726,178 B2 | 4/2004 | Grandage |
| 6,935,618 B2 | 8/2005 | Welty et al. |
| 6,957,816 B2 | 10/2005 | Blease et al. |
| 6,959,908 B2 | 11/2005 | Isbitsky |
| 6,959,912 B2 | 11/2005 | Reeves et al. |
| 7,059,586 B2 | 6/2006 | Vanderberg et al. |
| 7,306,201 B2 | 12/2007 | Lam |
| 7,309,057 B2 | 12/2007 | Santiago |
| 7,350,766 B2 | 4/2008 | Comstock et al. |
| 7,431,264 B2 | 10/2008 | Leroux |
| 7,458,559 B2 | 12/2008 | Blenkush |
| 7,481,239 B2 | 1/2009 | McGuire et al. |
| 7,815,170 B2 | 10/2010 | Devine, Jr. et al. |
| 7,946,556 B1 | 5/2011 | Trott |
| 7,975,983 B2 | 7/2011 | Comeaux et al. |
| 8,056,882 B2 | 11/2011 | Ohlson et al. |
| 8,091,861 B2 | 1/2012 | Nesje |
| 8,220,778 B2 | 7/2012 | Langmesser et al. |
| 8,327,870 B2 | 12/2012 | Sidler |
| 8,365,760 B2 | 2/2013 | Sidler |
| 8,727,316 B1 | 5/2014 | Miao et al. |
| 8,840,085 B2 | 9/2014 | Choo et al. |
| 9,091,351 B2 | 7/2015 | Deocampo et al. |
| 9,249,888 B2 | 2/2016 | McEvoy et al. |
| 9,261,196 B2 | 2/2016 | McEvoy et al. |
| 9,360,122 B2 | 6/2016 | Kennedy |
| 9,416,881 B2 | 8/2016 | Takeda et al. |
| 9,528,612 B2 | 12/2016 | Zellweger et al. |
| 9,604,260 B2 | 3/2017 | Vanderburg et al. |
| 9,759,334 B2 | 9/2017 | Hunter et al. |
| 9,777,846 B2 | 10/2017 | Goodwin et al. |
| 9,784,373 B2 | 10/2017 | Puetz et al. |
| 9,809,382 B2 | 11/2017 | Marchesini |
| 9,845,890 B2 | 12/2017 | Paez |
| 9,885,420 B2 | 2/2018 | Sundararajan |
| 10,054,238 B2 | 8/2018 | Watterodt et al. |
| 10,077,844 B2 | 9/2018 | Parks, Jr. |
| 10,100,936 B2 | 10/2018 | Gradle |
| 10,161,529 B2 | 12/2018 | Nguyen et al. |
| 10,167,961 B2 | 1/2019 | Nguyen et al. |
| 10,274,089 B2 | 4/2019 | Nguyen et al. |
| 10,281,047 B2 | 5/2019 | Scattini |
| 10,323,755 B2 | 6/2019 | Ruelland et al. |
| 10,436,331 B2 | 10/2019 | Frey et al. |
| 10,451,187 B2 | 10/2019 | Roberts |
| 10,533,667 B2 | 1/2020 | Hoang et al. |
| 10,677,362 B2 | 6/2020 | Kennedy |
| 10,683,941 B2 | 6/2020 | Lah et al. |
| 10,746,306 B2 | 8/2020 | Parsons et al. |
| 10,890,261 B2 | 1/2021 | Reilly et al. |
| 10,900,575 B2 | 1/2021 | McEvoy et al. |
| 2004/0217319 A1 | 11/2004 | Reeves et al. |
| 2005/0218368 A1 | 10/2005 | Vanderberg et al. |

(56) References Cited

U.S. PATENT DOCUMENTS

| | | | | |
|---|---|---|---|---|
| 2009/0121173 | A1* | 5/2009 | Devine, Jr. | F16K 27/044 251/328 |
| 2010/0224815 | A1* | 9/2010 | Sidler | F16K 3/0227 251/326 |
| 2018/0252322 | A1* | 9/2018 | Sidler | F16K 3/0227 |

FOREIGN PATENT DOCUMENTS

| | | |
|---|---|---|
| CA | 1307514 A | 9/1992 |
| CA | 2246922 C | 9/1998 |
| CA | 2141005 C | 6/2000 |
| CA | 2266407 C | 2/2004 |
| CA | 2131110 C | 7/2004 |
| CA | 2196860 C | 11/2005 |
| CA | 2594083 C | 1/2008 |
| CA | 3011532 C | 7/2017 |
| CN | 103644315 B | 3/2014 |
| CN | 203477382 U | 3/2014 |
| CN | 203532804 U | 4/2014 |
| CN | 103867739 B | 6/2014 |
| CN | 104482235 B | 4/2015 |
| CN | 104613188 B | 5/2015 |
| CN | 109282048 B | 1/2019 |
| CN | 210128090 U | 3/2020 |
| CN | 210218729 U | 3/2020 |
| CN | 210344346 U | 4/2020 |
| DE | 25 06 140 A1 | 8/1976 |
| EP | 0171693 B1 | 2/1986 |
| EP | 0409519 B1 | 1/1991 |
| EP | 0895011 B1 | 3/1999 |
| EP | 1869350 B1 | 12/2007 |
| EP | 2210022 B1 | 7/2010 |
| EP | 2216572 B1 | 8/2010 |
| EP | 2247879 B1 | 10/2010 |
| EP | 2396578 B1 | 12/2011 |
| EP | 2743550 B1 | 6/2014 |
| EP | 2839191 B1 | 2/2015 |
| EP | 2893229 B1 | 7/2015 |
| EP | 2947359 B1 | 11/2015 |
| EP | 3120054 B1 | 1/2017 |
| EP | 3143313 B1 | 3/2017 |
| EP | 3350490 B1 | 7/2018 |
| KR | 0166598 B1 | 3/1999 |
| KR | 100809640 B1 | 9/2006 |
| KR | 101324566 B1 | 2/2013 |
| KR | 101316000 B1 | 7/2013 |
| KR | 101300891 B1 | 8/2013 |
| KR | 101999528 B1 | 5/2019 |

\* cited by examiner

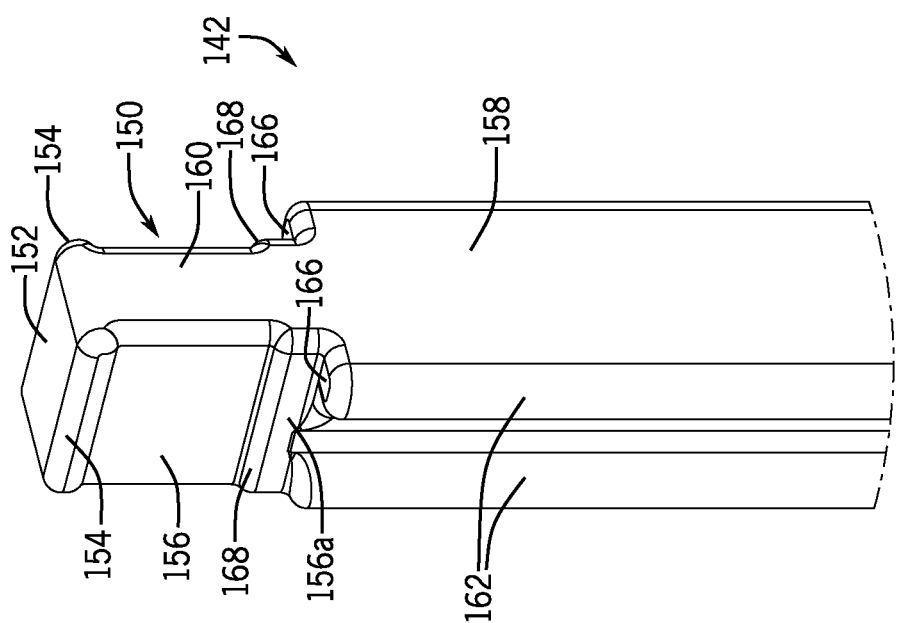
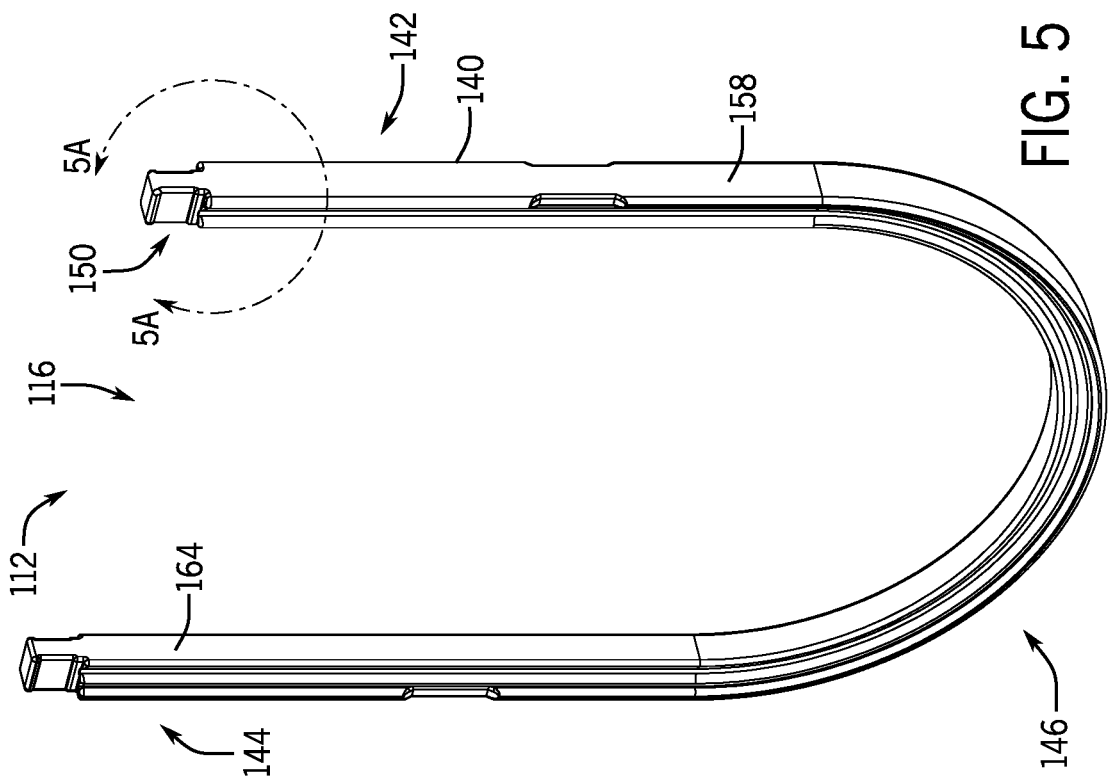
FIG. 5A
FIG. 5

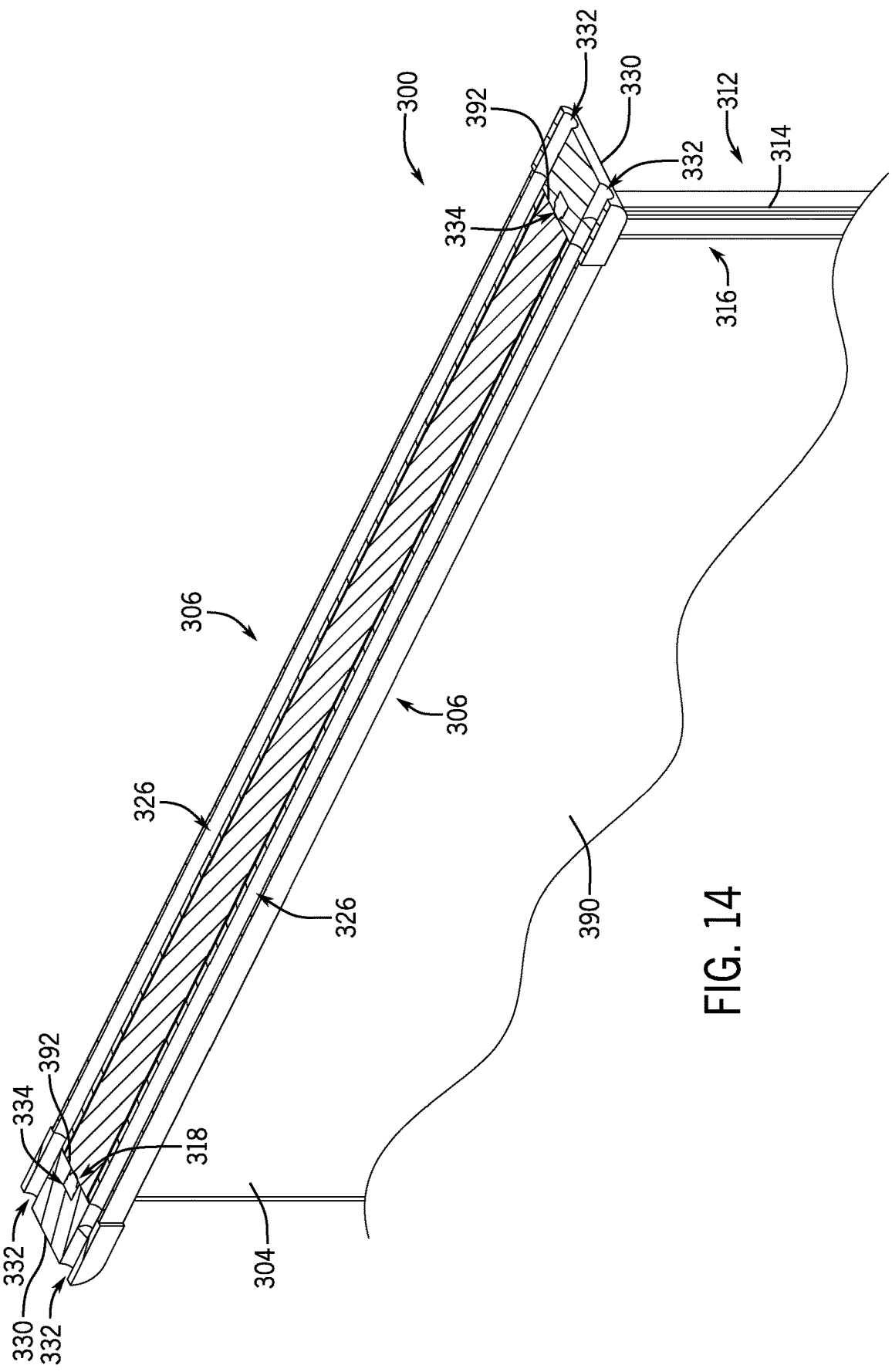

SEALING ASSEMBLY FOR A KNIFE GATE VALVE

RELATED APPLICATIONS

Not applicable.

BACKGROUND

Gate valves or knife gate valves are used to control the flow of fluid, such as process fluid, in a pipeline. These valves include a housing having a fluid passageway and a moveable gate for opening or closing the fluid passageway. The gate is configured to slide within a gate passage of a valve body structure. In an open position, the gate is positioned to allow flow through the fluid passageway between inlet and outlet ports of the valve. In a closed position, the gate is positioned to close the fluid passageway and inhibit flow. A gate seat and packing material can be used to form seals along the gate, to prevent flow past the gate, when the gate is closed, and to generally prevent leakage of process fluid from the valve.

SUMMARY OF THE INVENTION

Some embodiments of the invention provide a knife gate valve for flow along a flow path. The knife gate can include a body structure that includes a gate passage and defines a fluid aperture that includes the flow path, and a gate disposed to move within the gate passage between open and closed positions to selectively open or close the fluid aperture. A gate seat can extend from a first extension on a first side of the gate passage, around a portion of the fluid aperture, to a second extension on a second side of the gate passage, and can be configured to engage a free end and lateral edges of the gate to seal the fluid aperture when the gate is in the closed position. A first transverse element can be formed of resilient material, and can extend laterally across the gate passage to form a seal with a first side of the gate and with the first and second extensions of the gate seat. A second transverse element can be formed of resilient material, and can extend laterally across the gate passage to form a seal with a second side of the gate, opposite the first side relative to the flow path, and with the first and second extensions of the gate seat.

A knife gate valve can include a gate seat having an integrally formed seat body that includes first and second extensions. Each of first and second transverse elements can contact the seat body at the first and second extensions to form a seal.

A knife gate valve can include a gate and first and second extensions configured to form a respective extended seal with a respective lateral edge of the gate. Each of the first and second extensions can exhibit a narrowed portion along the extended seal, relative to a width dimension parallel to a flow path. First and second transverse elements can interlock with a gate seat along the narrowed portion of the first and second extensions to form seals with the first and second extensions.

A knife gate valve can include one or more transverse elements that include a contact surface configured to form a seal with a respective side of a gate, and an elongate channel opposite the contact surface. A body structure of the knife gate valve can include one or more protrusions that are seated within one or more lateral end portions of the one or more elongate channels.

A knife gate valve can include one or more protrusions disposed within a first transverse recess of the body structure that extends laterally across the body structure and receives a transverse element.

A knife gate valve can include one or more protrusions that include a passage that extends between a port at an exterior of the body structure and a first elongate channel of a transverse element for sealing a gate. The passage can be configured to direct packing material from the port into the first elongate channel.

A knife gate valve having a gate can include a first protrusion that extends within a first elongate channel of a transverse element for sealing a gate, from a lateral end portion of the first elongate channel past a lateral edge of the gate.

A knife gate can have a gate seat. The gate seat can include a U-shaped seat body and a first bridge element positioned along a first extension of the U-shaped seat body. First and second transverse elements can form a seal with the first extension via contact with the first bridge element.

A knife gate valve can include a first bridge element formed from a rubber material.

A knife gate valve can include a gate seat with a seat body that extends through a passage in a first bridge element to extend between first and second transverse elements that form a seal with the gate seat via the first bridge element.

A knife gate valve can include a first bridge element that extends in a direction of a flow path through the knife gate valve to overlap with at least one of a first or second transverse element. The first bridge element can include a passage for introduction of packing material into a channel of the at least one of the first or second transverse elements.

A knife gate valve can include first and second transverse elements that extend laterally past a lateral edge of a gate of the knife gate valve to overlap with a first bridge element of a gate seat of the knife gate valve.

A knife gate valve having a gate can include a gate seat with a first bridge element that extends laterally past a lateral edge of the gate to form a seal with at least one of a first or second transverse element.

A knife gate valve having a body structure and a gate can include a first transverse element. The first transverse element can include a contact surface for the gate, a channel opposite the contact surface, and a lip extending away from the channel, opposite the contact surface. The knife gate valve can include a scraper body that extends along the first transverse element outside the channel and extends between the gate and the lip, with the lip between the scraper body and the body structure.

Some embodiments of the invention provide a sealing assembly for a knife gate valve that includes valve bodies that define a fluid aperture, and further includes a gate configured to slidably move between the valve bodies to selectively block the fluid aperture. The sealing assembly can include a gate seat configured to sealingly engage the gate at the fluid aperture, with a U-shaped seat body with a base portion that is configured to extend around a portion of the fluid aperture, and first and second extensions on opposing sides of the base portion that are configured to extend on opposing sides of the fluid aperture. A first transverse element can be formed from rubber material and configured to sealingly engage a first face of the gate and to extend laterally across the gate to overlap with, and form a seal with, each of the first and second extensions. The sealing assembly includes a second transverse element formed from rubber material and configured to sealingly engage a second face of the gate and to extend laterally across the gate to overlap with, and form a seal with, each of the first and second extensions.

A sealing assembly for a knife gate valve with valve bodies can include first and second transverse elements. The transverse elements can include an elongate channel configured to extend laterally along a gate and receive one or more protrusions that are formed in a respective one of valve bodies.

A sealing assembly for a knife gate valve with a gate can include first and second transverse elements. The transverse elements can include a main body with a contact surface configured to form a seal with a respective face of a gate and first and second lips extending from opposite sides of the main body, opposite the contact surface. The sealing assembly can further include first and second sets of scrapers. Each of the scrapers can be configured to seat against the main body of a respective one of the first or second transverse elements and against a respective one of the first or second lips of the respective first or second transverse elements to secure the first and second lips against a respective one of valve bodies.

Some embodiments of the invention provide a valve body for a knife gate valve that includes a gate, a gate seat, and a transverse element, the gate seat and the transverse element being configured to form a complete perimeter seal with the gate relative to flow through the knife gate valve. The valve body can include a seat recess configured to receive the gate seat, the seat recess extending partly around and on opposing sides of a fluid aperture defined by the valve body. The valve body can include a transverse recess that extends laterally across the valve body to overlap with the seat recess on the opposing sides of the fluid aperture. A plurality of protrusions can be included within the transverse recess, including a first protrusion at a first lateral end of the transverse recess and a second protrusion at a second lateral end of the transverse recess. Each of the protrusions can be configured to be inserted into a channel of the transverse element when the transverse element is received in the transverse recess.

A valve body can include a first and second protrusion that include a passage that extends through the first or second protrusion and is in fluid communication with a transverse recess and a respective packing port of the valve body.

BRIEF DESCRIPTION OF DRAWINGS

FIG. 5 is an isometric view of a gate seat of the knife gate valve of FIG. 2.

FIG. 5A is an enlarged view of a first extension of the gate seat of FIG. 5, taken at area 5A-5A of FIG. 5.

FIG. 14 is a cross-sectional view of the sealing assembly of FIG. 13 taken along line 14-14 of FIG. 13.

DETAILED DESCRIPTION OF THE INVENTION

Figure 1:
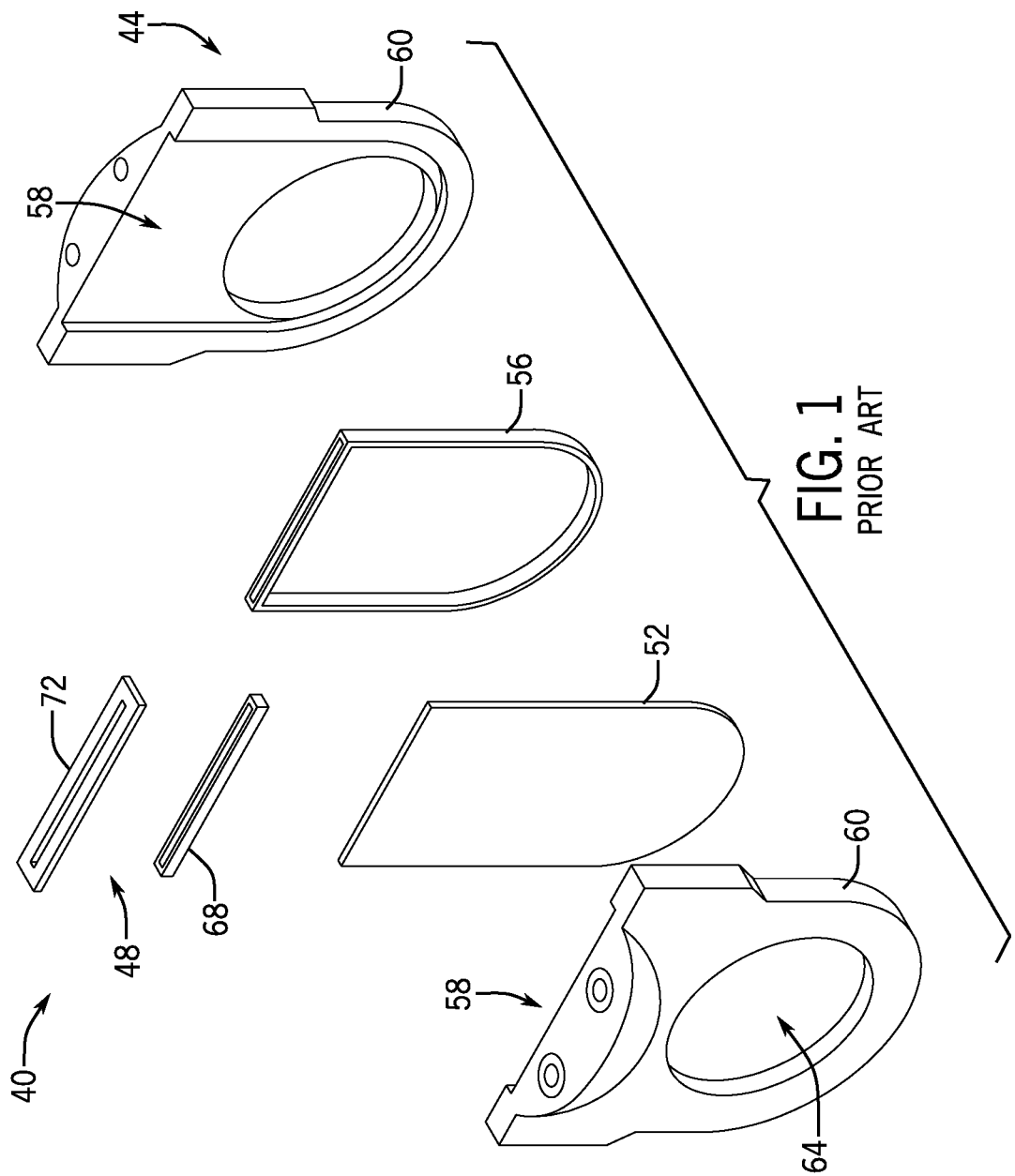
FIG. 1 is an exploded perspective view of components of a conventional knife gate valve.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise specified or limited, the term "U-shaped" specifies a shape that includes a base portion and at least two spaced-apart leg portions extending in generally similar directions from the base portion (i.e., parallel to each other to within 15 degrees). In some embodiments, a "U-shaped" member can include leg portions extending from opposite ends of the base portion. In some embodiments, leg portions can extend at substantially right angles relative to the base portion (i.e., deviating from right angles by less than 5 degrees), with or without curved, chamfered, or otherwise non-square connecting regions between the leg portions and the base portion. In some embodiments, leg portions can extend from a base portion substantially in parallel with each other (i.e., deviating from parallel by less than 5 degrees).

Also as used herein, in the context of gate valves, "lateral" indicates a direction that extends through a gate valve perpendicularly to a relevant flow axis of the gate valve. In some cases, a "lateral" direction may be defined relative to gravity or relative to a direction of motion of a gate of a gate valve. For example, in a gate valve with a planar gate that moves between open and closed positions in parallel with gravity, a "lateral" axis can extend perpendicularly to gravity and the direction of motion of the gate valve, within a plane defined by the gate. In some cases, a "lateral" direction may coincide with certain radial directions relative to a circular flow aperture within a valve body.

Generally, unless otherwise specified or limited, directional terms are used herein with respect to example orientations or particular illustrations only and are not intended to indicate absolute orientations. For example, some components may be described as "upper" or "lower" components, which may indicate the position of those components relative to others for a given (e.g., illustrated) configuration, but which may not necessarily limit those components to an absolute position.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the invention generally relate to a sealing assembly for a knife gate valve, including as described in further detail below. In general, it can be useful to ensure that a gate of a knife gate valve is appropriately sealed so that process fluid does not leak out of the valve during operation or leak past the gate when the valve is closed. Due to the movable configuration of gate valve gates, it may be required to establish a seal along edges of the gate (e.g., at a free, bottom end of the gate and along opposing lateral sides of the gate) and also to establish a seal that extends transversely across opposing (e.g., upstream and downstream) faces of the gate. In particular, to prevent leakage past a gate when the gate is closed, a full perimeter seal (i.e., a seal that extends unbroken around a closed geometric shape) may need to be established that includes both faces of a gate, as well as the edges of the gate.

FIG. 1 illustrates a conventional knife gate valve 40 configured with a conventional sealing assembly. The knife gate valve 40 includes a valve body assembly 44, a gland assembly 48, a gate 52, and a gate seat 56. The valve body assembly 44 includes first and second body halves 60 and defines a passageway 64, through which process fluid can flow along a flow path, and a gate passage 58, along which the gate 52 can be moved between open and closed configurations. Although not shown in FIG. 1, various known mechanisms to control movement of the gate or other known assemblies can also be included in some configurations.

The gate seat 56 is dimensioned to receive the gate 52, with the gate 52 capable of sliding through a slot in an upper part of the gate seat 56 during operation. In this regard, side and bottom portions of the gate seat 56 help to seal the lateral and bottom (free-end) edges of the gate 52 when the gate 52 is closed. However, the upper part of the gate seat 56, through which the gate 52 slides, generally cannot be relied on to provide sufficient sealing across the upstream and downstream faces of the gate 52. Thus, the gate seat 56 alone does not provide a full perimeter seal for the gate 52.

Therefore, to protect against leakage of process fluid, additional sealing components are provided via the gland assembly 48. In particular, the gland assembly 48 includes a packing element formed from non-resilient (i.e., non-elastic) conventional packing material 68 and a gland box 72. When the knife gate valve 40 is assembled, the gland box 72 presses the packing material 68 downward (i.e., in a direction perpendicular to the flow path) against the top portion of the gate seat 56. Thus, via the downward (and transverse to flow) pressure from the gland box 72, the moldable packing material 68 can be urged into sealing engagement with the top side of the gate seat 56 and with opposing faces of the gate 52, to complete full perimeter seals that extend across each face of the gate 52.

The conventional use of packing material, including as illustrated in FIG. 1, can provide useful sealing for knife gate valves, but can also be unreliable in some contexts, can be difficult to install and maintain, or can otherwise reduce the efficacy of conventional sealing assemblies. Some embodiments of the invention can address these issues, or others, while still ensuring appropriate, full-perimeter sealing of a gate of a knife gate valve.

In this regard, for example, embodiments of the invention can generally include a knife gate valve, a sealing assembly for a knife gate valve, or other related valve components and assemblies, in which a transverse sealing member not formed from packing material is provided (or provided for). The transverse sealing member can (or can be supported to) extend laterally across a face of a valve gate to sealingly engage the gate face and also sealingly engage a gate seat at opposing lateral sides of the gate face. Thus, for example, a gate seat can function in combination with transverse sealing members that extend across each face of a gate to ensure that appropriate sealing is provided on upstream and downstream sides of the gate, including when the gate is closed. Further, in some embodiments a transverse seal can be established without requiring packing material to directly provide a seal with a gate or with a gate seat, such as through direct contact between the packing material and the gate or the gate seat. Similarly, a transverse seal can generally be established by the compression forces generated by assembly of a valve (i.e., as applied to urge opposing valve bodies together), rather than by a separate compression of packing material toward a flow aperture (e.g., as in the valve 40 of FIG. 1).

In some embodiments, a resilient transverse member may interlock with a resilient gate seat on opposing lateral sides of a gate to provide a continuous seal that extends from the relevant face of the gate (e.g., as provided primarily by the transverse member) onto the lateral edge of the gate (e.g., as provided primarily by the gate seat). For example, recessed features on a gate seat can receive portions of a transverse member (or vice versa) to provide secure sealing engagement between the transverse member and the gate seat.

In some embodiments, an inner volume of a resilient transverse member can be configured to receive packing material (e.g., non-resilient, injectable material), such as may be useful to ensure that a resilient sealing face of the transverse member (e.g., as disposed opposite the inner volume) establishes and maintains appropriate sealing with a face of a gate. In some embodiments, a valve body and a transverse member can be configured so that packing material can be introduced (e.g., injected) into an inner volume of the transverse member even with the valve otherwise fully assembled. This may be useful, for example, to allow a sealing engagement of the transverse member with a gate to be renewed in situ, in response to wear of a sealing face of the transverse member over time.

In some embodiments, a valve body can include support structures for a transverse sealing member. For example, a valve body can include a protrusion that is configured to seat (e.g., nest) within an inner volume (e.g., a channel) of a transverse sealing member, to provide structural support for the transverse sealing member. Such an arrangement, for example, can ensure that lateral end portions of the transverse sealing member maintain appropriate structural integrity (e.g., are not adversely deformed), so as to be able to provide appropriate sealing with lateral side portions of a gate face and with sealing faces of a gate seat. As another example, such an arrangement can facilitate introduction of packing material into an inner volume of a transverse sealing member. For example, a protrusion that is configured to extend into a channel of a transverse member can include a passage that allows packing material to be moved through the protrusion into the channel (e.g., from a port at the outside of the relevant valve).

In some embodiments, a gate seat that is sealingly engaged by a transverse sealing member can be a unitary component. For example, extensions of a unitary gate seat body on opposing lateral sides of a flow aperture of a valve can be configured to contact (e.g., interlock with) transverse sealing members in both upstream and downstream directions on both lateral sides of a gate.

In some embodiments, a gate seat can be formed from multiple components. For example, a unitary gate seat body may provide an extended seal along peripheral edges of a gate, including along extensions of the gate seat body on opposing sides of a flow aperture. Further, a bridge element can extend between, and sealingly engage with, the extensions of the gate seat body and transverse sealing elements that extend laterally from contact with the bridge element to seal opposing faces of a gate.

Some embodiments herein are presented as knife gate valves, or sub-assemblies thereof, that have symmetrical components (e.g., relative to a plane defined by operational motion of a gate of the relevant valve). In some cases, a symmetrical configuration can help to reduce complexity and production costs. For example, a symmetric knife gate valve may have substantially identical valve body members and a gate seat that is symmetric about an axis that is perpendicular to flow through the knife gate valve, allowing for relatively streamlined manufacturing and maintenance of the knife gate valve. Additional benefits of a knife gate valve having symmetrical components may include improved structures for bi-directional flow at a rated pressure, without fluid leakage around the gate. For example, substantially identical valve bodies, at least relative to support for a gate, may provide substantially identical pressure ratings for the gate regardless of the direction of flow.

In some embodiments, transverse sealing arrangements according to the invention can be particularly suitable for symmetrical valve configurations. However, despite the potential advantages of symmetrical valve assemblies, the principles of the invention as disclosed herein are generally not limited to symmetrical configurations. Correspondingly, some embodiments within the scope of this disclosure may not be symmetrical or may exhibit partial or complete symmetry in other ways than is expressly shown or described.

Figure 2:
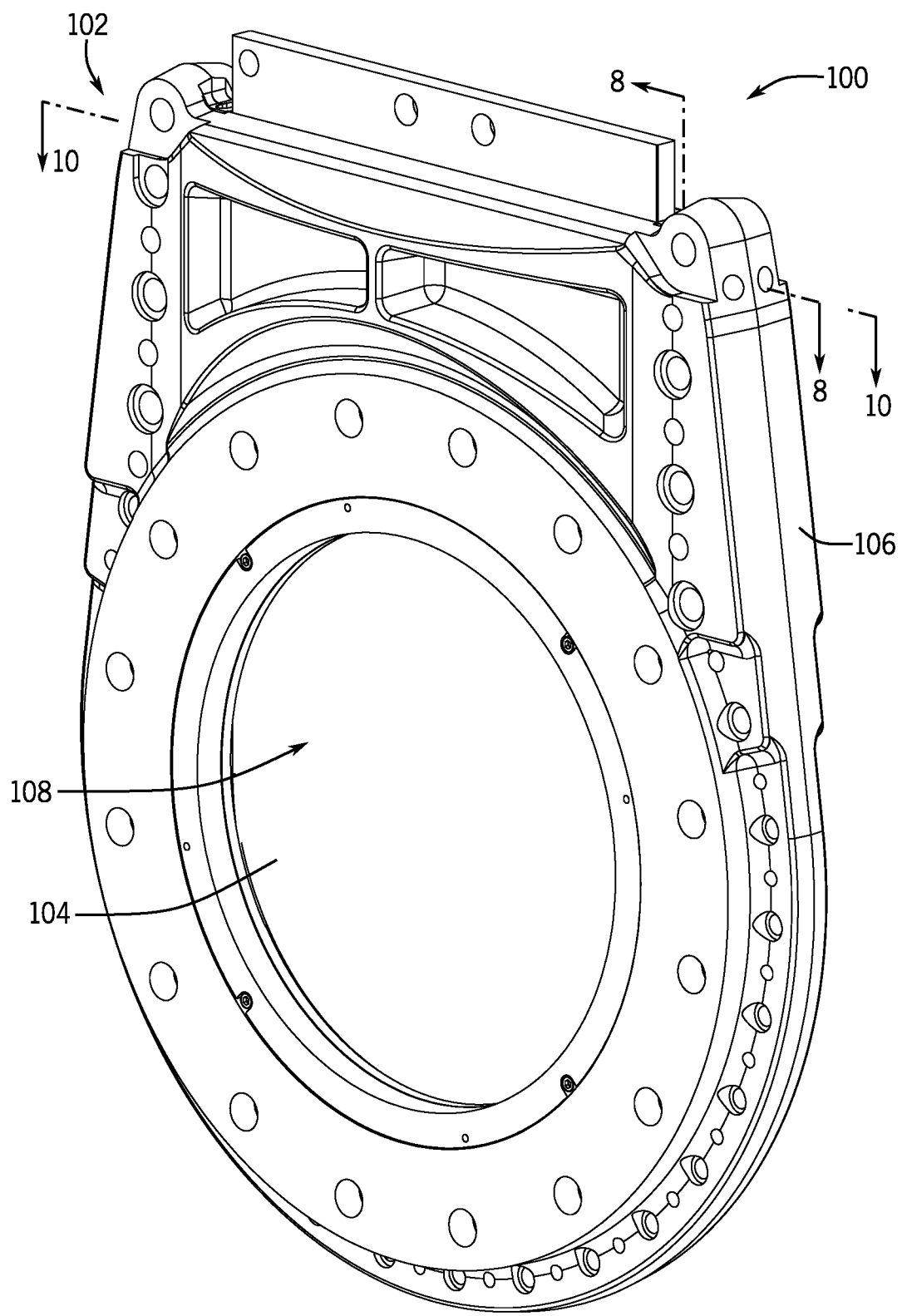
FIG. 2 is an isometric view of components of a knife gate valve according to an embodiment of the invention.
Figure 3:
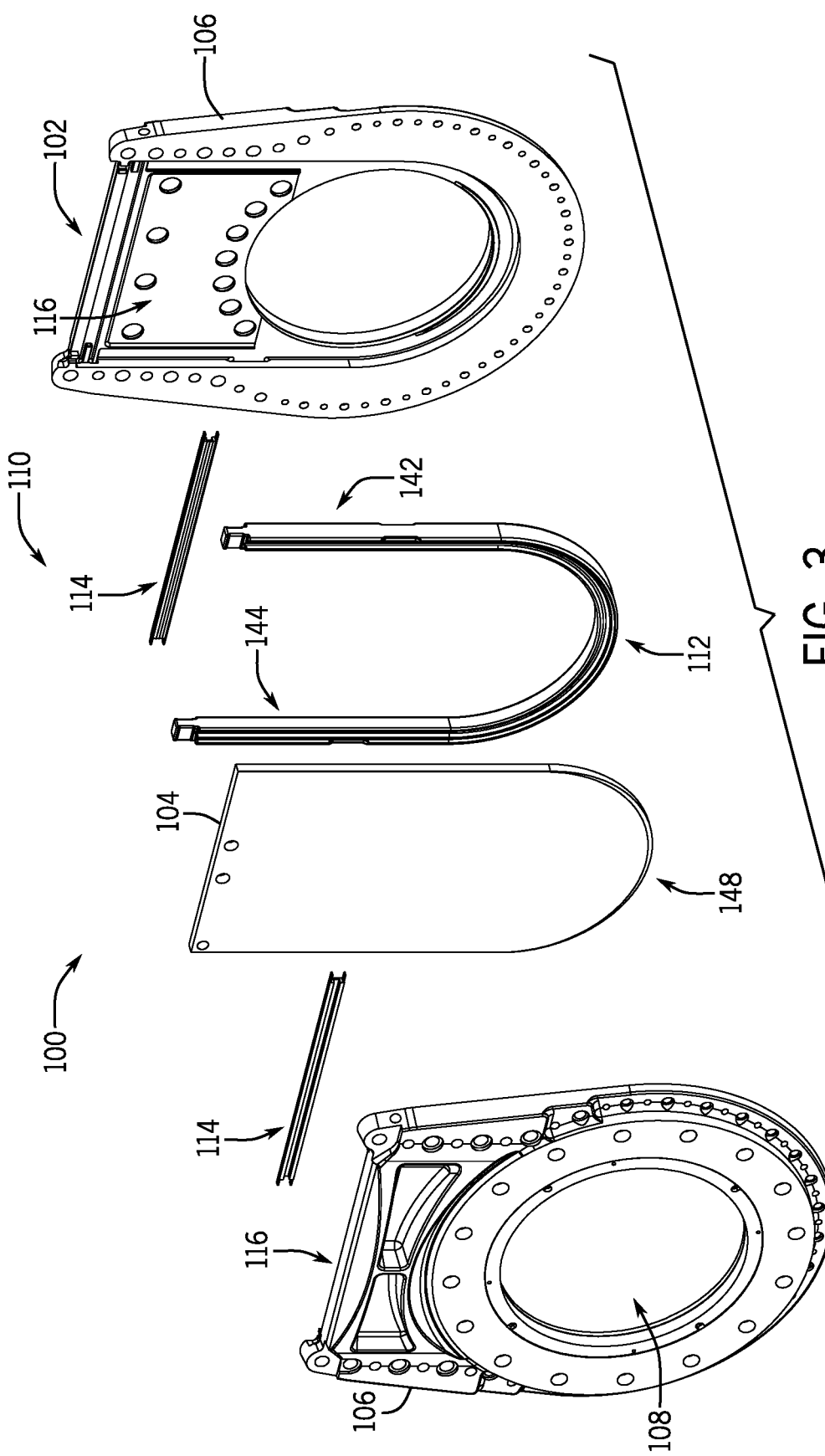
FIG. 3 is an exploded isometric view of the components of the knife gate valve of FIG. 2.

FIGS. 2 and 3 illustrate a knife gate valve 100 according to one embodiment of the invention. The knife gate valve 100 includes, among other valve components, a body structure 102 and a gate 104. The body structure 102, as illustrated, includes first and second symmetrical valve bodies 106 that collectively define a fluid aperture 108 and a gate passage 116 that the gate 104 moves within, between open and closed positions. The fluid aperture 108 provides a flow path through which a process fluid can flow bi-directionally.

The gate 104, as further described below, can move between a variety of open positions (see, e.g., FIG. 8) and a fully closed position (see FIG. 2) to selectively open or close the fluid aperture 108. As also noted above, in other embodiments, valve body structures can have internal or external elements so that the first and second valve bodies of the body structures are not necessarily symmetrical.

As shown in FIG. 3 in particular, the knife gate valve 100 further includes a sealing assembly 110. The sealing assembly 110 includes a gate seat 112 and first and second transverse elements 114. As further discussed below, the gate seat 112 includes a lower portion (from the perspective shown) that extends around—and seals the gate 104 along—a lower portion of the flow aperture 108. The gate seat 112 also includes first and second extensions 142, 144 that extend—and seal the gate 104—along opposing lateral sides of the flow aperture 108 as well as vertically past the flow aperture 108 into a chest portion of the valve 100. The first and second extensions 142, 144 are configured to be seated against the valve bodies 106 on opposing lateral sides of the gate passage 116, so that the gate 104 can be moved between and along the extensions 142, 144, with continual sealing engagement along at least part of the extensions 142, 144.

Unlike conventional packing, each of the transverse elements 114 is formed from resilient material (e.g., rubber). The transverse elements 114 extend laterally across the valve 100 in a direction that is generally perpendicular to the flow path (and gravity, in the orientation shown), to sealingly engage with the first and second extensions 142, 144 on opposing lateral sides of the respective face of the gate 104. Thus, when the gate 104 is closed, the transverse elements 114 and the gate seat 112 can form complete perimeter seals on upstream and downstream sides of the gate 104, without the need to install, press, and maintain packing material directly in contact with the gate 104 or the gate seat 112, such as illustrated for the configuration of FIG. 1.

In the embodiment illustrated, as further discussed below, the transverse elements 114 engage opposing (e.g., upstream and downstream) faces of the first and second extensions 142, 144 to provide a continuous seal from the gate 104 onto the gate seat 112, although other configurations are possible. Correspondingly, pressure to establish the seal can be applied generally in the direction of a flow axis and mainly by the compression of the valve bodies 106 together to assemble the valve 100. As also noted above, this general arrangement stands in contrast to configurations such as illustrated in FIG. 1, in which a separate compression force perpendicular to the flow direction must be applied, after the valve bodies 60 are assembled together, to compress packing material 68 into a sealing engagement with the gate 52 and the top side of the gate seat 56.

In the illustrated embodiment, the transverse elements 114 are substantially identical (i.e., identical to within acceptable tolerances for a common manufacturing process) and are installed symmetrically on opposing sides of the gate 104. Thus, discussion below of a single one of the transverse elements 114 generally applies equally to both of the transverse elements 114. In some embodiments, however, only a single transverse element may be provided, or multiple transverse elements may not be substantially identical to each other.

In different embodiments, transverse sealing elements can exhibit different profiles. In some embodiments, as also discussed above, a transverse sealing element can include a sealing face that is configured to engage a gate, and can also define an inner volume. In some embodiments, a sealing face of a transverse sealing element that is configured to sealingly engage a gate can also be configured to sealingly engage a gate seat, to provide a continuous seal—without intervening packing material—from a relevant face of the gate to the gate seat and, correspondingly, to and around the associated edge of the gate.

Figure 4:
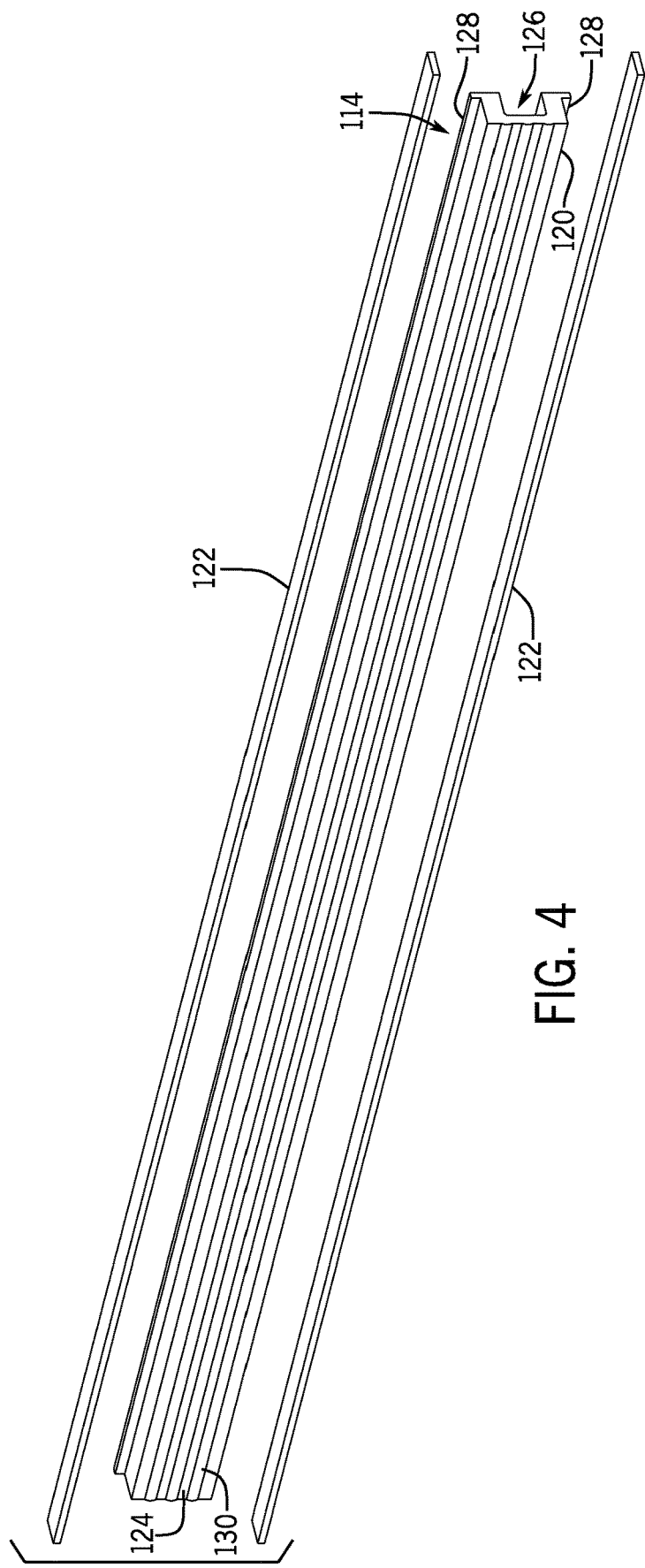
FIG. 4 is an exploded isometric view of a transverse element and scraper bodies of the knife gate valve of FIG. 2.

In some embodiments, a transverse sealing element can define a sealing face and an inner volume that includes an internal channel. In this regard, for example, FIG. 4 illustrates the transverse element 114 of the sealing assembly 110 in particular detail. For the illustrated embodiment, the transverse element 114 includes a main body 120. The main body 120 includes a contact surface 124, a channel 126 opposite the contact surface 124, and lips 128 that extend away from the channel 126. In particular, the channel 126 is an open-sided channel and the lips 128 extend away from the ends of side walls of the channel 126 that are opposite the contact surface 124, although other configurations are possible.

In some embodiments, a contact surface for a transverse sealing element can include particular geometry to improve sealing engagement of the transverse sealing element with a face of a gate or with a gate seat. For example, the contact surface 124 includes surface elements 130 configured as a plurality of laterally extending ribs that span the full lateral length of the contact surface 124. However, other configurations are possible. For example, some transverse sealing elements can include surface elements configured as any number of ridges or other protrusions, as indentations, or as other structures, which may extend fully or partially across the relevant contact surface, may extend in partly or fully non-lateral directions, and so on. In some embodiments, a contact surface may be smooth and continuous without notable surface elements.

Continuing with respect to the illustrated embodiment, the channel 126 is configured as an elongate channel that extends along the entire lateral length of the transverse element 114, with a substantially rectangular cross section (i.e., deviating from rectangular in a rest state by less than 5 degrees at any vertex). However, other configurations are possible. For example, some cross-sections may be rectangular with other aspect ratios, may be non-rectangular, may extend only partly along a lateral length of a transverse sealing element (e.g., extending from both ends of the element, but being interrupted by other structure(s) in a central region), and so on.

In some embodiments, a cross section of a transverse element may be configured to be flexed or otherwise deformed when acted on by an external force (e.g., when receiving a material therein). For example, as will be further described below, the channel 126 can receive a packing material that can cause the channel 126 to bulge along the length of the main body 120 of the transverse element 114. In some cases, this can help to ensure appropriate sealing between the contact surface 124 and the gate 104 (see FIG. 3) or between the contact surface 124 and a portion of the gate seat 112 (see FIG. 3). As noted above, the transverse element 114 is formed from a resilient material, such as rubber, for example, that can recoil back to an original shape after bending, stretching, or being compressed. For example, some embodiments can use HNBR or EPDM rubber, including rubber of 60 durometer hardness or harder, as may contribute to appropriate and durable sealing with a movable gate and with a gate seat and, more generally, to suitably long lifespans for the transverse sealing elements.

In some embodiments, a transverse sealing element may include other structures that can help to secure the sealing element within a valve or to support or otherwise appropriately locate other components. Still referring to FIG. 4, for example, the lips 128 can be configured to support scraper bodies 122 (e.g., relatively stiff, unitary scrapers), while also allowing the scraper bodies 122 to help to secure the transverse element 114 in place within the valve 100 as a whole. In the illustrated embodiment the lips 128 extend away from the channel 126 opposite the contact surface 124 by a distance that is less than a width of the channel 126 measured in the same direction that the lips 128 extend, although other configurations are also possible. Each of the scraper bodies 122, in the installed configuration (see, e.g., FIG. 8), extends along the main body 120 of the transverse element 114 outside the channel 126 and proximate to the respective lips 128. Thus, as further discussed below, the lips 128 and the main body 120 generally can help to appropriately locate and support the lips 128, while the lips 128 can also help to secure the main body 120 relative to the larger valve 100.

In the embodiment shown, the lateral length of the scraper bodies 122 is greater than the lateral length of the main body 120 of transverse element 114. A relatively short length of a transverse sealing element, to a degree, may be beneficial in some cases, as further discussed below. In other embodiments, however, a transverse element may have a length that is greater than or substantially equal to the length of one or more associated scraper bodies. Similarly, although a set of two of the scraper bodies 122 are illustrated, to be supported by the bi-symmetrical transverse element 114, other configurations may have different numbers or configurations of scraper bodies (including no scraper bodes), differently symmetrical or non-symmetrical transverse sealing elements, and so on.

FIGS. 5 and 5A illustrate the gate seat 112 of the knife gate valve 100. The gate seat 112 includes a single, integrally formed seat body 140 although, as also noted above and further discussed below, some gate seats may be formed from multiple distinct bodies. In particular, the seat body 140 is a U-shaped seat body, with the first extension 142, and the second extension 144 extending substantially in parallel with each other away from a base portion 146 that has a congruent geometry to that of the lower half of the fluid aperture 108 (see, e.g., FIG. 3).

In the illustrated embodiment, the first extension 142 and the second extension 144 extend substantially in parallel from opposing sides of the base portion 146 and have substantially similar cross sections and surface features. In other words, the gate seat 112 is symmetric about an axis that is perpendicular to the flow path. As a result, details described below with respect to the first extension 142 generally also apply to the second extension 144. Similarly, the seat body 140 is symmetric about a plane that is defined by the gate 104 when the valve 100 is fully assembled (see, e.g., FIG. 8). Accordingly, and with the transverse elements 114 also being symmetrical and substantially identical to each other, discussion of a sealing engagement or other structural relationship between one of the transverse elements 114 and the seat body 140 (e.g., toward a first face of the gate 104) generally also applies to the corresponding engagement or relationship between the other of the transverse elements 114 and the seat body 140 (e.g., toward a second face of the gate 104).

In general, the gate seat 112 is dimensioned to at least partially surround a portion of the fluid aperture 108 of the knife gate valve 100 and is configured to engage a free end 148 of the gate 104 (see, for example, FIG. 3) and lateral edges of the gate 104 to seal the fluid aperture 108 when the gate 104 is in the closed position. Correspondingly, the first extension 142 extends from the base portion 146 to a first lateral side of the gate passage 116, as well as beyond the gate passage 116 into the valve body structure 102, and the second extension 144 extends from the base portion 146 to a second lateral side of the gate passage 116, as well as beyond the gate passage 116 into the valve body structure 102 (see also FIG. 3). As further discussed below, and shown in FIG. 8 in particular, the transverse elements 114 sealingly engage the first and second extensions 142, 144 within the valve body structure 102, adjacent to the gate passage 116 (see, e.g., FIG. 3) but spaced apart from the fluid aperture 108. However, other configurations are also possible. For example, some transverse seals may sealingly engage a gate seat in other locations, including adjacent to a relevant flow aperture.

In some embodiments, a transverse sealing element can be configured to interlock with a gate seat such that at least part of the transverse sealing element is at least partly surrounded by structures of the gate seat, or vice versa. In some embodiments, an interlocking engagement can be achieved by providing a narrowed portion of a gate seat that receives a portion of a transverse sealing element for a sealing engagement (or vice versa). In this regard, for example, as illustrated in FIGS. 5 and 5A, each of the first extension 142 and the second extension 144 includes a narrowed portion 150 relative to a width dimension that extends parallel to the flow path. As shown in FIG. 5A in particular, the narrowed portion 150 extends vertically (from the illustrated perspective) and terminates at a seat end 152. The seat end 152 includes first and second upper ledges 154 that extend outward from the seat end 152 in a direction parallel to the flow path so that the relative width dimension at the seat end 152 is greater than at the narrowed portion 150 below the seat end 152.

The narrowed portion 150 includes a first transverse contact surface 156 and a second transverse contact surface (not shown) that is opposite the first transverse contact surface 156 relative to the flow direction. To provide for a particular interlocked arrangement, each of the contact surfaces 156 is bounded by a widened shoulder, as provided at a first end by the ledges 154 and at a second end by ledges 168. In the example illustrated, the ledges 154, 168 extend away from the contact surfaces 156 in a direction that is generally parallel with the flow axis by a distance that is less than a width of the transverse elements 114 (see, e.g., FIG. 4). In other embodiments, however, other interlocking structures are possible, including similar ledges that extend by different amounts, channels or recesses that fully receive and surround a transverse element (or other structure), and so on.

Still referring to FIGS. 5 and 5A, an outer surface 158 extends continuously around the seat body 140 from the first extension 142 to the second extension 144 and generally provides a bridging structure 160 at the narrowed portion 150. The bridging structure 160 bridges the first transverse contact surface 156 and the second transverse contact surface and can therefore extend a sealing line from the transverse elements 114 across the seat body 140 when the transverse elements 114 engage the transverse contact surfaces 156.

In some embodiments, a seat body can also include features to engage a valve body, or other useful structures. For example, the seat body 140 further includes a plurality of ridges 162 that extend from the first extension 142 to the second extension 144 between the continuous outer surface 158 and an inner surface 164 of the gate seat 112. The plurality of ridges 162 terminate at a lower ledge 166 proximate to the narrowed portion 150, which lower ledge 166 extends in a direction generally parallel with the flow axis somewhat farther than the ledges 168. Thus, an extension 156a of the transverse contact surface 156 extends between the ledges 168, 166.

Figure 6:
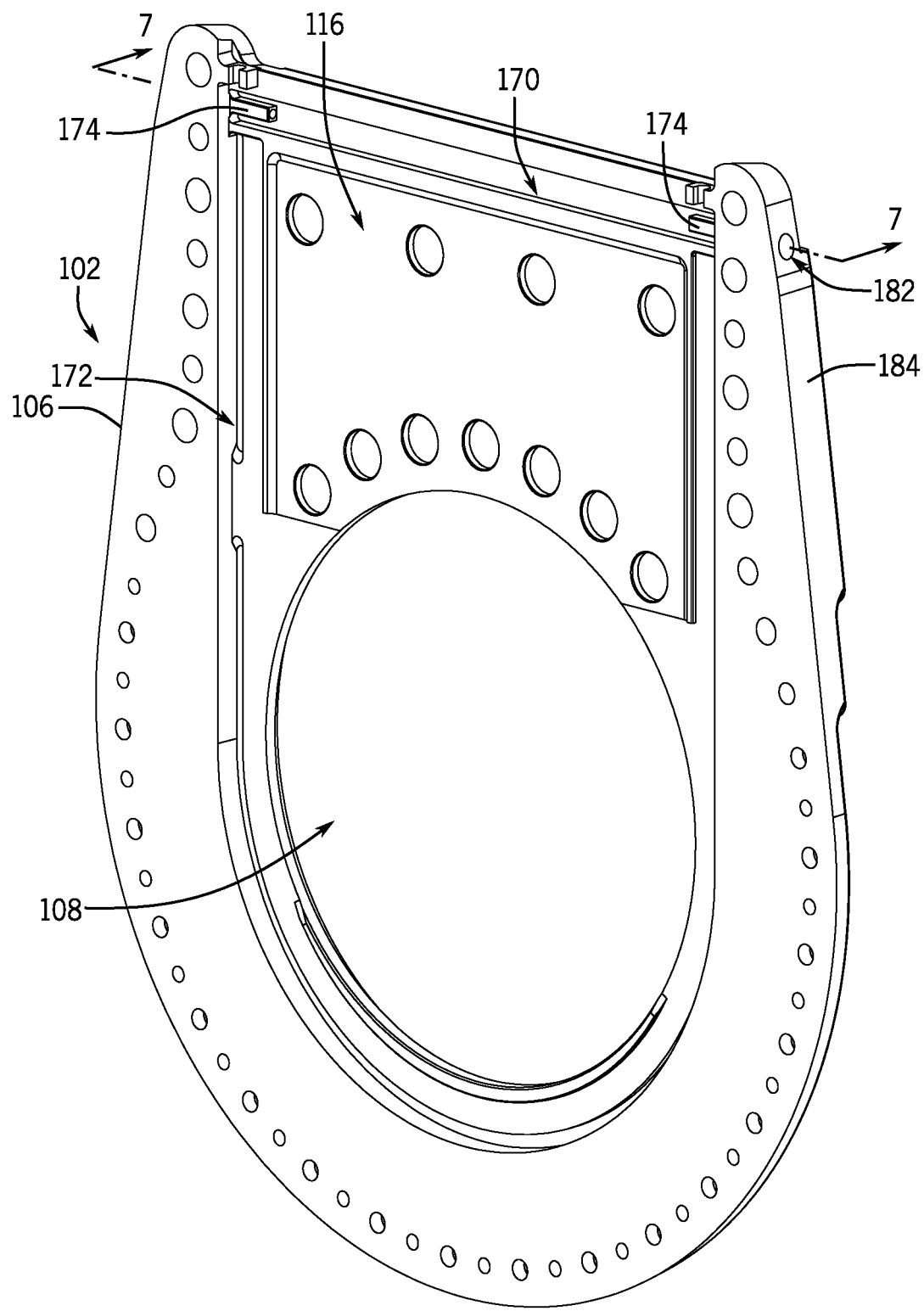
FIG. 6 is an isometric view of a valve body of the knife gate valve of FIG. 2.
Figure 7:
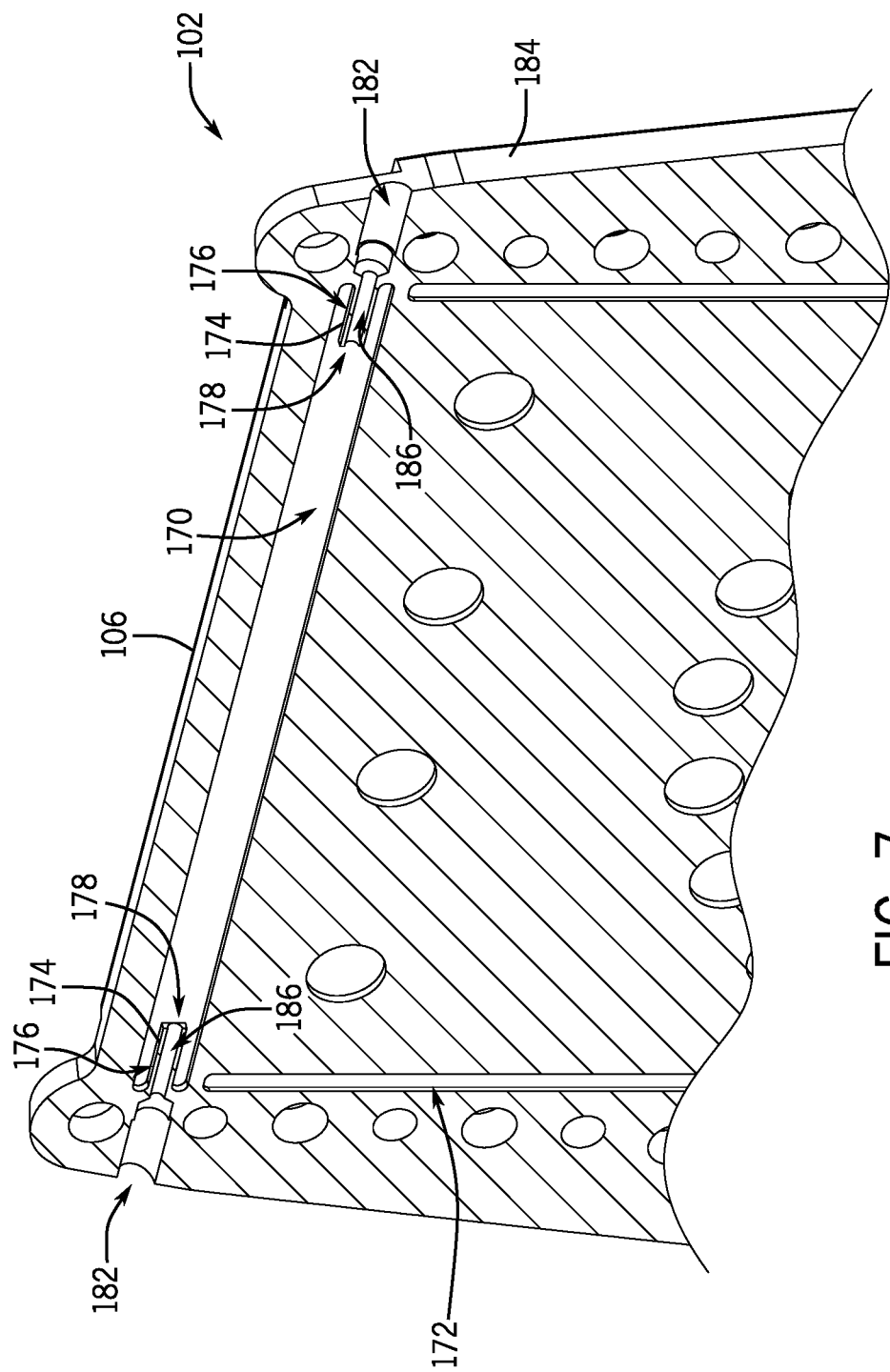
FIG. 7 is a cross-sectional view of the valve body of FIG. 6 taken along line 7-7 of FIG. 6.

In some embodiments, a valve body can include features that are configured to receive and secure a transverse sealing element, so that the transverse sealing element is aligned and maintained in position to sealingly engage with a gate and with a gate seat. In this regard, for example, FIGS. 6 and 7 illustrate one of the valve bodies 106 of the knife gate valve 100. Among other structural elements, the valve body 106 includes a transverse recess 170 and a seat recess 172. In the illustrated example, the transverse recess 170 extends laterally across the valve body 106 and is dimensioned to receive the transverse element 114 (see, for example, FIG. 8). The seat recess 172 extends around and on opposing sides of the fluid aperture 108 as well as into the body 102 away from the fluid aperture 108 and is dimensioned to receive the gate seat 112. For example, an outer one of the ridges 162 may be configured to nest within a deeper portion of the seat recess 172 to secure the gate seat 112 within the valve 100.

As shown in FIG. 7 in particular, the transverse recess 170 laterally overlaps with the seat recess 172 at lateral ends 176 of the transverse recess 170 (i.e., extends laterally to or past the seat recesses 172). As further discussed below, this arrangement can help to ensure that the transverse elements 114, which can be seated within the transverse recesses 170 on respective body halves 106, are securely held in position to sealingly engage with respective sides of the gate seat 112 and thereby provide an appropriate perimeter seal relative to each face of the gate 104.

In some embodiments, a body structure for a valve can include one or more protrusions that are configured to extend into one or more inner areas of a corresponding transverse seal. Such an arrangement, for example, can help to secure the transverse seal in appropriate position and prevent deformation of the transverse seals during installation or operation, so as to ensure appropriate sealing. In some cases, a protrusion can also help to ensure that packing material can be introduced (e.g., injected) into an inner area of a transverse sealing element, including to ensure that appropriate sealing with a gate can be maintained throughout the life of the transverse sealing element.

In this regard, for example, as shown in FIGS. 6 and 7 in particular, the body structure 102 includes a plurality of protrusions within the transverse sealing recess 170. In particular, the valve body 106 includes first and second protrusions 174 at opposing lateral end portions 176 of the transverse recess 170 (see FIG. 7), with similar protrusions (not shown) being symmetrically provided by the other valve body 106, for the illustrated symmetric embodiment. In the illustrated example, the protrusions 174 are configured as peninsula structures that extend from each lateral end of the transverse recess 170 to terminate at a medial end 178, so that three sides of the protrusion 174 proximate to the medial end 178 are surrounded by the transverse recess 170. Further, in this example, the protrusions 174 extend toward the medial ends 178 to laterally overlap with opposing lateral sides of the seat recess 172 and with the gate passage 116 (see, e.g., FIG. 6). The protrusions 174 are dimensioned to be received within the channel 126 of the transverse element 114 (see, e.g., FIG. 4) when the main body 120 of the transverse element 114 is received by the transverse recess 170, as will be described in greater detail below with respect to FIG. 8.

As also noted above, it may be useful to introduce packing material to help support a transverse sealing element, including to provide an enhanced seal with a gate. To this end, for example, the valve body 106 further includes first and second ports 182 on opposite lateral sides thereof, accessible from an exterior 184 of the valve body 106. The ports 182 are configured as packing ports and are dimensioned to receive and direct a packing material from the exterior 184 of the valve body 106 into the sealing recess 170—and the channel 126 of the transverse element 114—once the knife gate valve 100 is assembled. Generally, the packing material may be a non-elastic material, such as self-forming, moldable, fibrous, or flakey material, for example, in contrast to the generally resilient configuration of a transverse sealing element.

In some embodiments, passages to introduce packing material can extend through protrusions that are received in an inner area of a transverse sealing element (e.g., as discussed generally above). Referring in particular to FIG. 7, each of the protrusions 174 includes a passage 186 that extends between the port 182 and the medial end 178 of the protrusion 174 to provide fluid communication between the transverse recess 170 and the respective port 182. Similar to the ports 182, the passages 186 are dimensioned to receive and direct packing material into the channel 126 of the transverse element 114, although the passages 186 may in some cases be smaller or otherwise differently sized than part or all the ports 182. In the illustrated embodiment, the passage 186 is fully enclosed by the protrusion 174; however, other configurations are possible. For example, in some embodiments, a passage can be partially enclosed by a protrusion, including such that a passage is formed as a channel that is at least partly open-sided along a body structure of a valve.

Figure 8:
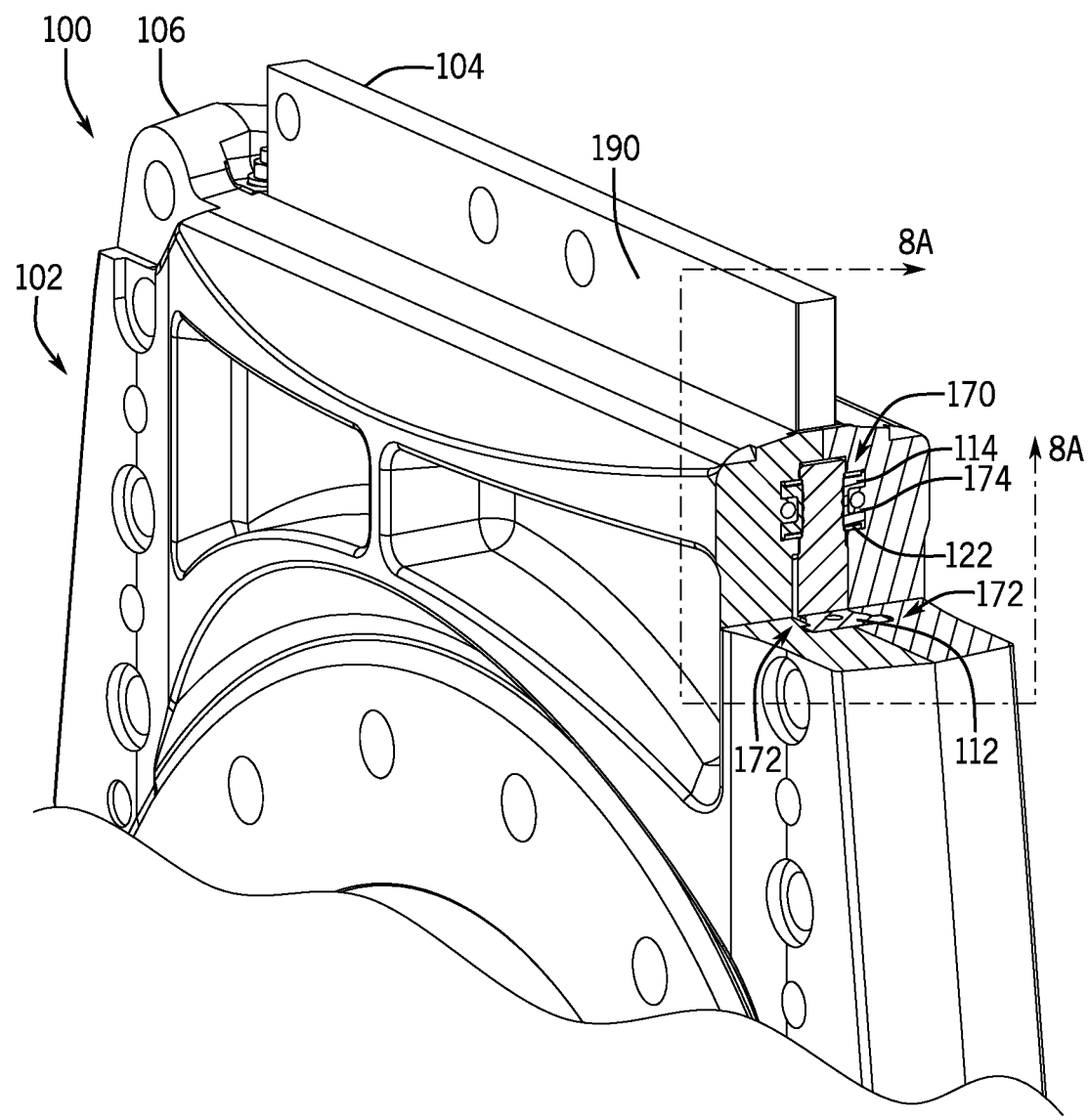
FIG. 8 is a partial section view of the knife gate valve of FIG. 2 taken along line 8-8 of FIG. 2.
Figure 8A:
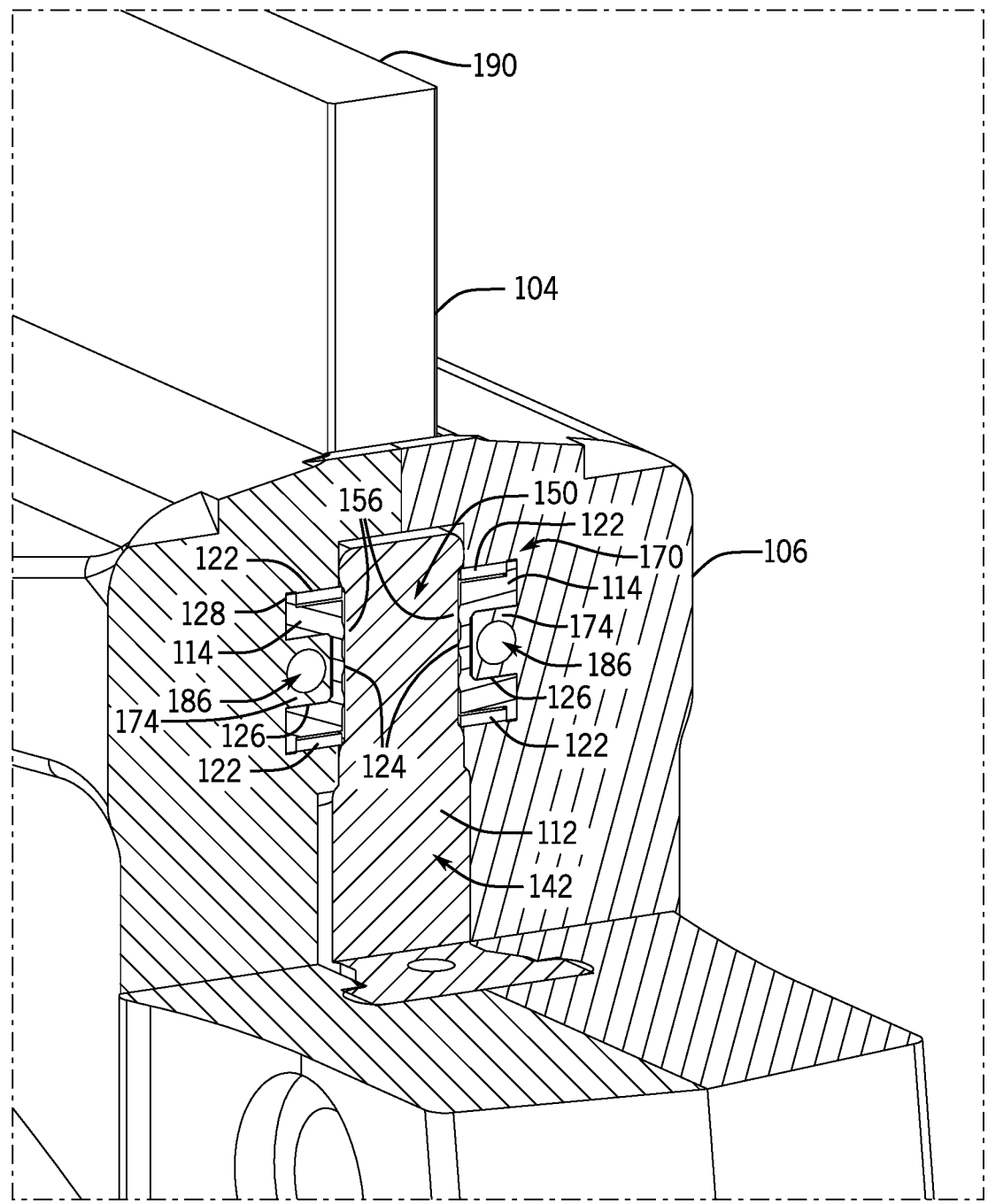
FIG. 8A is an enlarged view of the area 8A-8A of FIG. 8.

FIGS. 8 and 8A illustrate the knife gate valve 100 assembled and in a closed position, with the gate seat 112 disposed in the seat recesses 172, and the transverse element 114 disposed in the transverse recess 170. As shown in FIG. 8A in particular, the scraper bodies 122 extend and are secured between the gate 104 and the respective lips 128 proximate to the main bodies 120 of the respective transverse elements 114, with the scraper bodies 122 also helping to secure the lips 128 relative to the valve bodies 106. As noted above, however, other scraper (or no-scraper) configurations are possible.

With this arrangement, particularly relative to the configuration of the gate seat 112 and the transverse elements 114, the gate seat 112 and the transverse elements 114 can form a complete perimeter seal with the gate 104 relative to flow in both directions through the knife gate valve 100. The seal is formed in general by resilient sealing bodies, rather than packing material, that engage the gate 104 fully around a sealing perimeter, without gaps, to prevent leakage between the body structure 102 and edges of the gate 104.

In particular, as shown in detail in FIG. 8A, the contact surface 124 of the transverse element 114 forms a seal with a respective face 190 of the gate 104. Further, each of the transverse elements 114 extends laterally past the lateral edges of the gate 104 to contact the seat body 140 at the first extension 142 and the second extension 144 to form the seal. In the illustrated embodiment, each transverse element 114 overlaps with and contacts the seat body 140 at the respective narrowed portion 150. Accordingly, contact surfaces 156 on opposing sides of the narrowed portion 150 are in contact with each of the respective contact surfaces 124 of the transverse elements 114 to form the respective seals and the transverse elements 114 are securely interlocked with the seat body 140. As also discussed above, this may result in a particularly strong and reliable seal, although other configurations are also possible.

Figure 10:
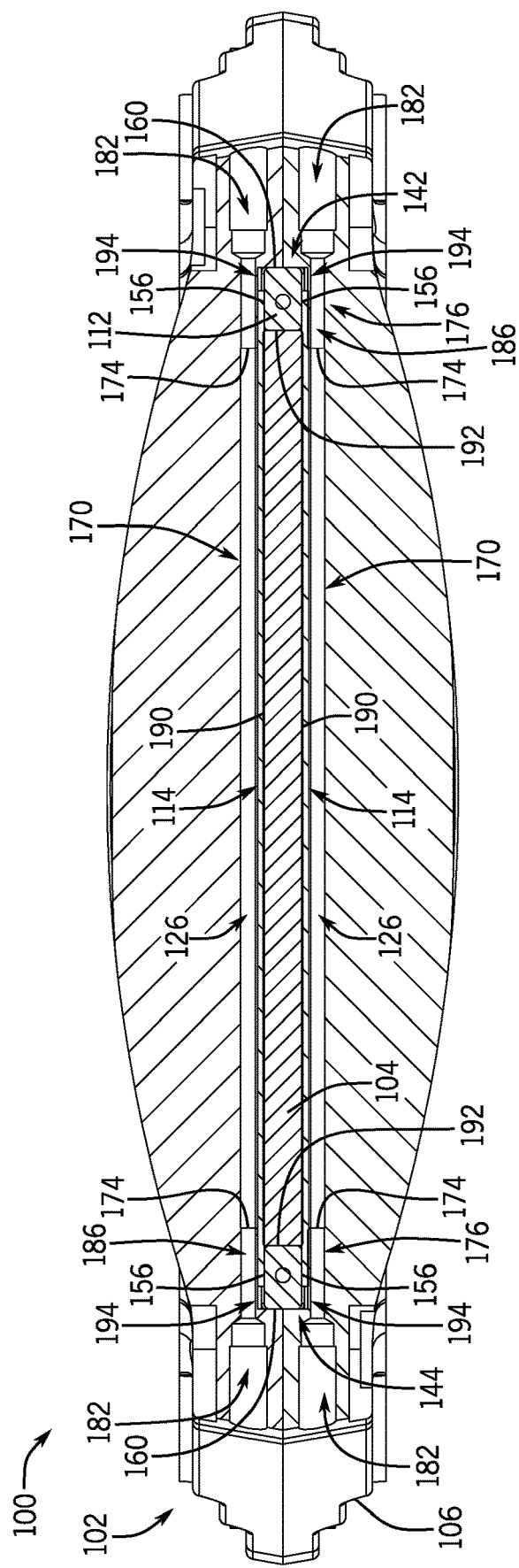
FIG. 10 is a top cross-sectional view of the knife gate valve of FIG. 8 taken along line 10-10 of FIG. 2.

As also shown in FIG. 8A and in FIG. 10, the protrusions 174 extend within the channels 126 to secure and support the transverse elements 114. Correspondingly, the channel 126 may be filled with the packing material via the port 182 (see FIG. 7), which is in fluid communication with the channel 126, via the passage 186. The packing material can provide a controllable density within the channel 126 that can be adjusted (i.e., increased with more packing material urged into the channel 126) to bias or deform the main body 120 of the transverse element 114 toward the gate 104 to create a transverse seal. Throughout the life of the knife gate valve 100, additional packing material can also be added to the channel 126 via the port 182 and the passage 186 to compensate for wear to the main body 120 and thereby ensure that appropriate sealing with the gate 104 is maintained. Of further note, because packing material is loaded into the body structure 102 laterally, not vertically as in conventional approaches, the height of the knife gate valve 100 does not affect the capabilities or efficacy of the packing material capabilities. In general, if the height of a valve can be reduced, there is less material required to assemble the valve and there is a smaller pressure boundary area which can correspond to lower probability of valve leakage for an otherwise equivalent construction.

In different embodiments, protrusions to help secure transverse sealing elements can exhibit a variety of geometries. In the example configuration for the valve 100, as shown in FIG. 8A in particular, corners of the protrusions 174 that extend into the channels 126 of the transverse elements 114 are chamfered. This configuration, or other similar arrangements (e.g., rounded corners) can help to reduce wear on the transverse elements 114 and thereby prolong the lifespan of the transverse elements 114 and the sealing assembly 110 generally. In other embodiments, however, other configurations are possible for certain protrusions, including non-rectangular cross-sections, non-chamfered (or non-rounded) corners, and so on. Further, although the exposed faces of the protrusions 174 are illustrated as flat, including those surfaces that contact the transverse elements 114 opposite the contact surfaces 124 thereof, surfaces of other protrusions can be differently configured, including with configurations that are not fully planar but that are still complementary to the corresponding surfaces of the relevant transverse element.

Figure 9:
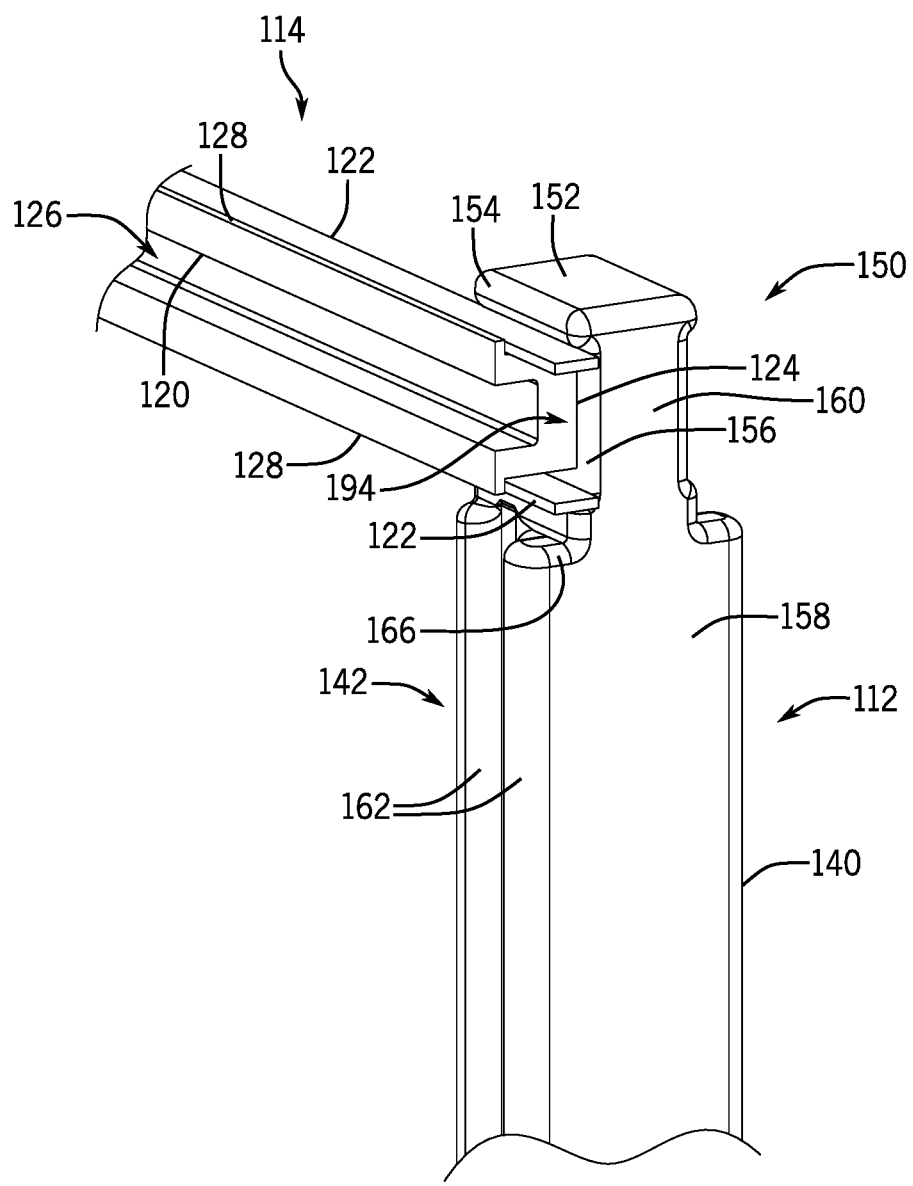
FIG. 9 is an isometric partial view of a gate seat and a transverse element of the knife gate valve of FIG. 2.

FIG. 9 illustrates in further detail the interlocking connection between the narrowed portion 150 of the seat body 140 and one of the transverse elements 114. In particular, the illustrated transverse element 114 is interlocked with the first extension 142 so that one of the scraper bodies 122 is in contact with the upper ledge 154, the other scraper body is in contact with the lower ledge 166, and the contact surface 124 is in contact with the transverse contact surface 156. The seal created by the engagement between the narrowed portion 150 and the transverse element 114, with reinforcement from the associated protrusion 174 as further discussed below (see, e.g., FIG. 8A), can provide a seal to prevent leakage at the lateral edges 192 of the gate 104. Further, engagement between the lips 128 and the scraper bodies 122, and the disposition of the lips 128 between the scraper bodies 122 and the associated valve body 106 (see, e.g., FIG.

8A) can help to locate and secure the transverse element 114 and the scraper bodies 122 for effective and durable operation.

As illustrated in FIG. 10 in particular, each of the transverse elements 114 extend laterally across the gate passage 116 within the respective transverse recesses 170, on opposite sides of the gate 104 relative to the flow path. As shown, each of the transverse elements 114 engages a respective one of the faces 190 of the gate 104 to form part of a laterally extending transverse seal for the gate 104 along the transverse recess 170. Further, the transverse elements 114 extend laterally past the edges 192 of the gate and laterally overlap with the narrowed portions 150 of the first and second extensions 142, 144, as also discussed above, to form a continuing—and continuous—seal at the lateral overlap between the transverse recess 170 and the seat recess 172. Finally, the inner surface 164 of the seat body 140 contacts the opposing lateral edges 192 of the gate 104 to form a bridge seal between the continuous seals provided by the transverse elements 114 on opposing upstream and downstream sides of the gate 104. Correspondingly, the body structure 102 also contacts the gate seat 112 at the continuous outer surface 158 and the ridges 162 to complete a seal at the seat recess 172. Thus, through interoperation of the transverse elements 114, the seat body 140, and the valve bodies 106, the gate 104 can be fully sealed.

As further illustrated in FIG. 10, because the transverse elements 114 are shorter laterally than the transverse recess 170, a gap 194 is formed proximate the lateral ends of the transverse elements 114, near where the transverse elements 114 overlap the first extension 142 and the second extension 144. As also shown in FIG. 9, the gap 194 is bounded on different sides by the associated main body 120, the scraper bodies 122, the seat body 140, and the valve body 106 (see FIG. 10). The gap 194 is formed outside of the seal perimeter provided for the gate 104 by the respective transverse element 114 and the gate seat 112, so as not to compromise the seal, and can usefully accommodate lateral deformation and expansion of the transverse elements 114 throughout the lifespan of the knife gate valve 100, without detrimental effect on the quality of the seal. In other embodiments, other configurations are also possible, including configurations in which scraper bodies do not extend to overlap with such a gap, and configurations in which a differently sized gap or no gap is provided.

As generally discussed above, protrusions on a valve body that engage a transverse sealing element can provide support and improved sealing in various ways. As another example, some protrusions can help to ensure appropriate sealing with a gate or other body, in addition (or as an alternative) to providing general structural support for a transverse sealing element. For example, as shown in FIG. 10, the protrusions 174 extend from respective lateral ends of the transverse recesses 170 laterally inward past the respective lateral edges 192 of the gate 104. As a result, as also generally discussed above, through reinforcement of the cross-sectional shape of the transverse element 114, the integrity of a flow path for packing material to enter the channel 126 beyond the lateral edges 192 of the gate 104 can be maintained, even with the transverse element 114 under the stresses of installation and operation.

Further, the extension of the structural support provided by the protrusions 174 along the gate seat 112 and laterally past the edges 192 of the gate 104 can generally help to ensure appropriate sealing between the transverse elements 114 and both the gate 104 and the gate seat 112. For example, the gate seat 112 may be generally formed from a harder resilient material than the transverse elements 114 and the gate 104 may also generally be substantially harder than the transverse elements 114. Thus, assembly and operation of the valve 100 may tend to impose deforming forces on the transverse elements 114, such as might generally tend to deform the transverse elements 114 so as to result in a seal of lower efficacy between the transverse elements 114 and the gate 104 or the gate seat 112. However, the rigid structure of the protrusions 174 can reinforce the transverse elements 114 generally, and the channels 126 in particular, along the gate seat 112 and near the edges 192 of the gate 104, to help ensure that an optimal sealing engagement is achieved.

Figure 11:
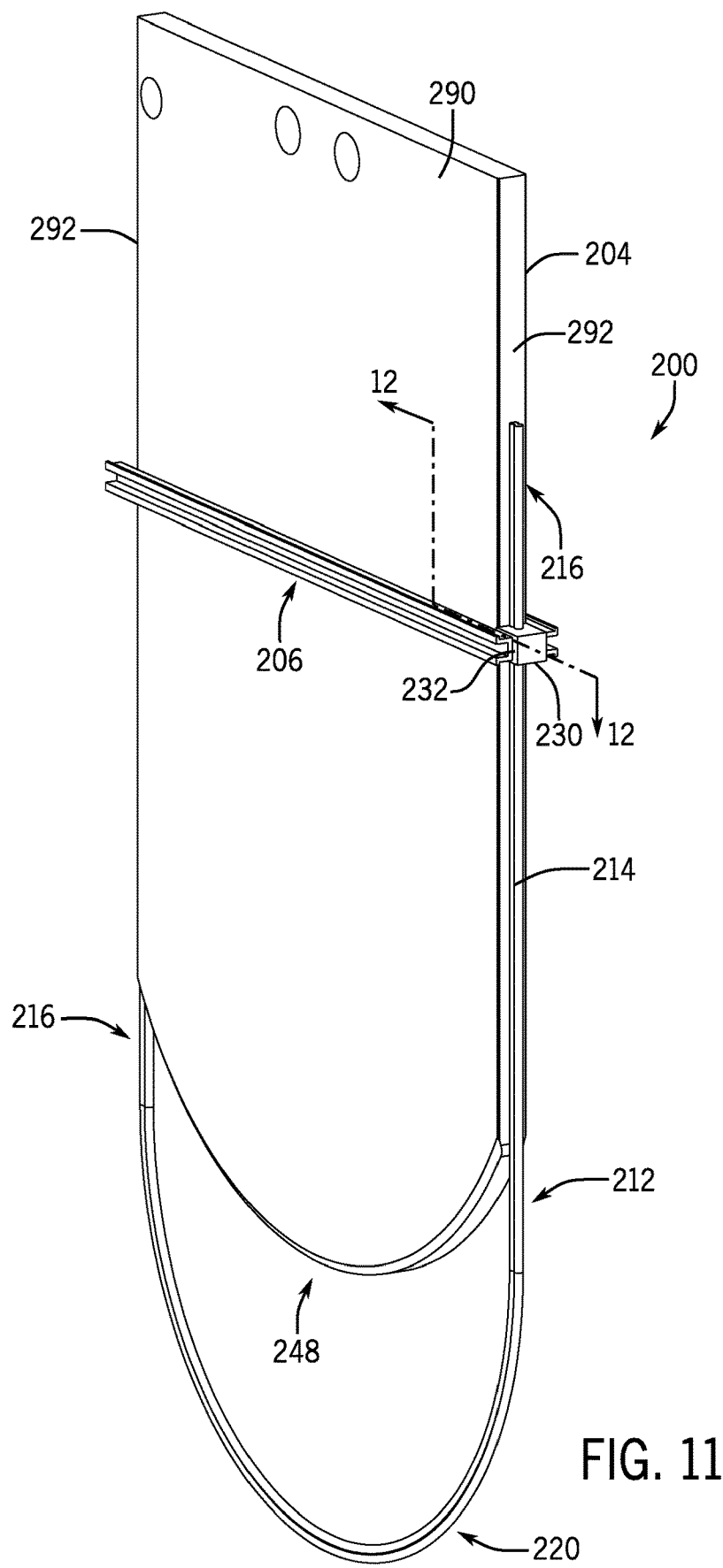
FIG. 11 is an isometric view of a gate and a sealing assembly for a knife gate valve according to an embodiment of the invention.

In some embodiments, as also noted above, differently configured of components can be used to provide appropriate sealing for a gate, relative to transverse sealing elements and gate seats. For example, some embodiments can include a gate seat that is formed from multiple components that can collectively provide a seal with edges of a gate and a continuous extension of that seal onto a transverse sealing element. In this regard, for example, FIG. 11 illustrates a sealing assembly 200 according to another embodiment of the invention. Generally, the sealing assembly 200 can be used in a knife gate valve similar to the knife gate valve 100 described above, including relative to a gate 204 with faces 290, a free end 248, and lateral edges 292. In particular, similarly to the sealing assembly 110, the sealing assembly 200 includes a gate seat 212 and transverse elements 206 that can cooperate to provide a full perimeter seal that includes both faces 290 of the gate 204.

The transverse elements 206 are generally similar (e.g., substantially identical) to the transverse elements 114 of the sealing assembly 110 (see, e.g., FIG. 4), and discussion of the transverse elements 114 herein thus generally applies to the transverse elements 206. In contrast to the gate seat 112, however, the gate seat 212 includes multiple components, including a seat body 214 and a set of bridge elements 230 (only one shown in FIG. 11). The seat body 214 is configured to seal edges of the gate 204 similarly to the gate seat 112, as described above, and includes a generally U-shaped body, with first and second extensions 216 and a base portion 220 having a congruent geometry to a lower portion (from the perspective shown) of a relevant fluid aperture. The first extension 216 and the second extension 216 extend from opposing sides of the base portion 220 and have substantially similar cross sections (e.g., a double O-ring, as shown, although other shapes are possible). As a result, details described below with respect to the first extension 216 apply to the second extension. In general, the gate seat 212 is dimensioned to at least partially surround a portion of a fluid aperture of a knife gate valve and is configured to receive the free end 248 of the gate 204 to seal the fluid aperture when the gate 204 is in the closed position. FIG. 11 illustrates the gate 204 in a partially open position, in which the free end 248 is spaced apart from the base portion 220, but a seal is maintained by the first and second extensions 216 along the gate edges 292.

Figure 12:
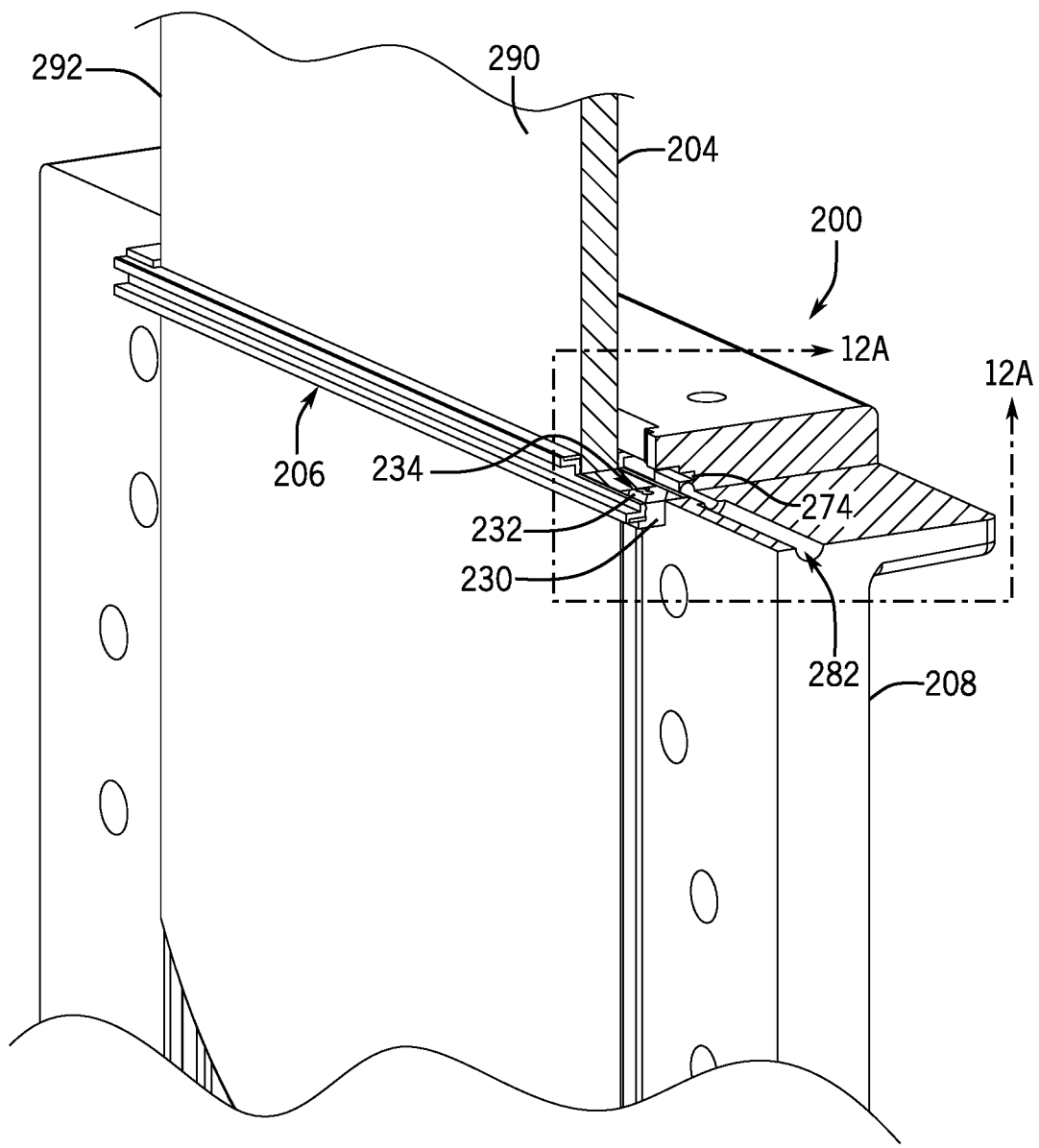
FIG. 12 is a partial isometric view of the gate and sealing assembly of FIG. 11, as installed with a valve body member, with a partial section taken along line 12-12 of FIG. 11.

To ensure that a seal for the valve appropriately extends across from the faces 290 of the gate (e.g., at the transverse elements 206 as shown) to the gate seat body 214, the sealing assembly 200 further includes a first and second bridge elements 230 (see also FIG. 12). In the illustrated embodiment, the bridge elements 230 are substantially identical and so discussion relative to the first bridge element 230 also generally applies to the second bridge element 230. In other example, however, one or more bridge elements may be configured differently or, as appropriate, omitted. Generally, each of the transverse elements 206 is configured to form a portion of a seal with seat body 214, at the first and second extensions 216 via contact with the first and second bridge elements 230, respectively. For example, in the illustrated embodiment, the first bridge element 230 is positioned along the first extension 216 and the second bridge 230 element is positioned along the second extension 216, with each bridge element 230 in sealing engagement with the seat body 214. Continuing, each of the transverse elements 206 extends laterally past the lateral edges 292 of the gate 204 to overlap and seal with the first and second bridge elements 230 at one of a set of opposing transverse contact surfaces 232 of the respective bridge element 230 (only one shown in FIG. 11). In the illustrated embodiment, the bridge elements 230 are formed from a rubber material, although other resilient material can be used in other embodiments.

Figure 12A:
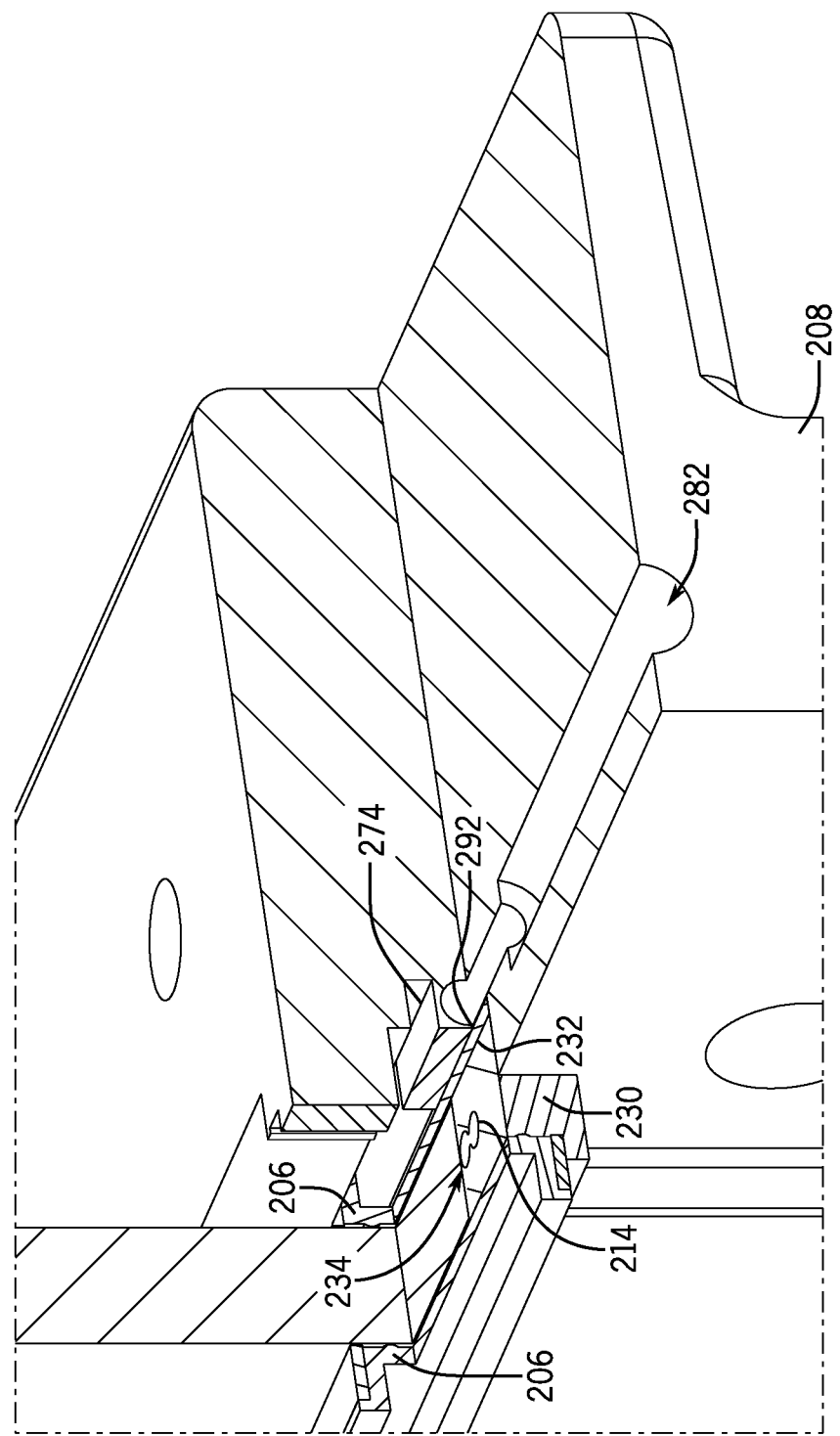
FIG. 12A is an enlarged view of the area 12A-12A of FIG. 12.

As illustrated in FIG. 12A in particular, each bridge element 230 is positioned proximate to a respective protrusion 274 of a valve body 208, configured similarly to the protrusions 174 of the valve body 208, with the transverse element 206 seated therebetween. In other words, the protrusions 274 extend laterally to overlap with the associated bridge element 230, a lateral end of the associated transverse element 206, and the associated lateral edge 292 of the gate 204. This overlap can provide corresponding benefits for support and sealing, as well as the ability to introduce packing material through a port 282 into an inner area (e.g., channel) of the transverse elements 206, as similarly discussed above relative to the transverse elements 114 and the protrusions 174 (see, e.g., FIG. 8A). Variations in design of a protrusion, a sealing element, or other components as discussed above relative to the valve 100 also generally apply relative to the protrusions 274, the transverse elements 206, and other components of the sealing assembly 200. For example, although no gap similar to the gap 194 (see, e.g., FIG. 10) is provided for the transverse elements 206, similar other embodiments can include such a gap.

To further provide for an appropriate seal for the gate 204, each of the bridge elements 230 includes a through passage 234 extending in a direction parallel to the direction of movement of the gate 204 and the direction of the respective extension 216 (see FIG. 11). Correspondingly, in the illustrated embodiment, the seat body 214 can extend through the passage 234 of the bridge element 230 to extend between lateral ends of the first and second transverse elements 206. Thus, a sealed, interlocking connection can be created between the seat body 214 and the bridge element 230 via the passage 234, such that a complete and reliable full perimeter seal is provided relative to each face 290 and the edges 292 of the gate 204.

In the illustrated embodiment, the bridge element 230 is distinct and separate from the seat body 214. However, other configurations are possible. For example, in some embodiments, a bridge element can be integrally formed with a seat body. Similarly, in some embodiments, a seat body may seal with a bridge element without passing through the bridge element (e.g., still with interlocking engagement or not), or a bridge element may pass through or otherwise interlock with a seat body.

Figure 13:
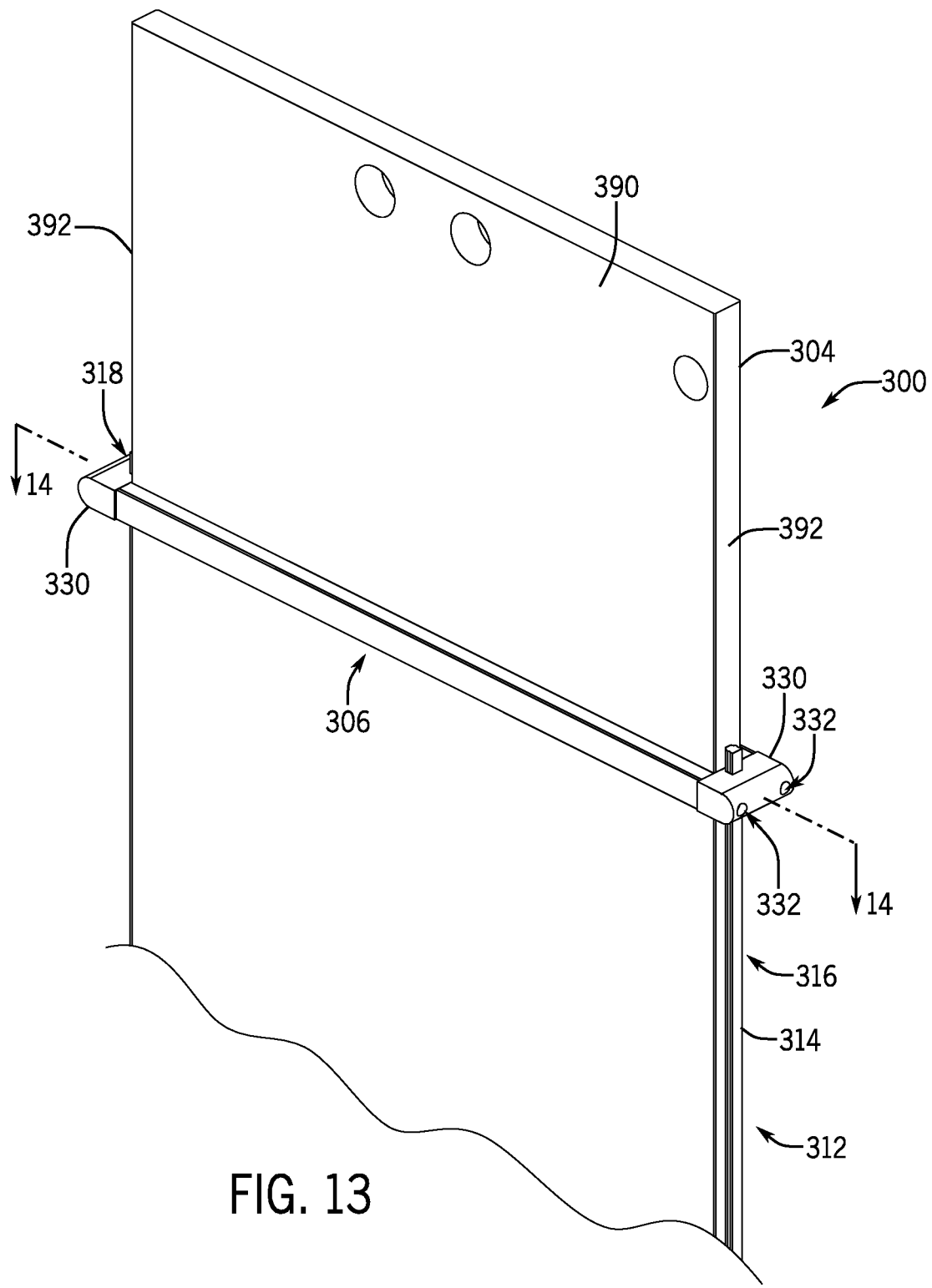
FIG. 13 is an isometric view of a gate and a sealing assembly for a knife gate valve according to an embodiment of the invention.

FIGS. 13 and 14 illustrate a sealing assembly 300 according to another embodiment of the invention, which can be used in a knife gate valve similar to the knife gate valve 100 described above, including relative to a gate 304 with faces 390, a free end (not shown), and lateral edges 392. In particular, similarly to the sealing assemblies 110, 200, the sealing assembly 300 includes a gate seat 312 and transverse elements 306. Thus, in many aspects, discussion of the sealing assemblies 110, 200 above, particularly relative to operation and general sealing of the gates 104, 204, is also applicable to the sealing assembly 300.

The transverse elements 306 are generally similar (e.g., substantially identical) to the transverse elements 206 of the sealing assembly 110 (see, e.g., FIG. 4) and discussion of the transverse elements 114, 206 above thus generally applies to the transverse elements 306. In contrast to the gate seat 112, however, the gate seat 312 includes multiple components, including a seat body 314 and a set of bridge elements 330. The seat body 314 has a generally U-shaped body with a first extension 316, a second extension 318, and a base portion having a congruent geometry to that of relevant fluid aperture, and can be installed for operation within a knife gate valve similarly to the gate seats 112, 212 described above. The first extension 316 and the second extension 318 extend from opposing sides of the base portion and have substantially similar cross sections. As a result, details described below with respect to the first extension 316 apply to the second extension 318. In general, the gate seat 312 is dimensioned to at least partially surround a portion of a fluid aperture of a knife gate valve and is configured to receive the free end of the gate 104 to seal the fluid aperture 108 when the gate 104 is in the closed position. FIG. 13 illustrates the gate 304 in a partially open position, in which the free end (not shown) is spaced apart from the base portion of the gate seat 312, but a seal is maintained by the first and second extensions 316, 318 along the gate edges 392.

To ensure that a seal extends from the faces 390 of the gate (e.g., at the transverse elements 306 as shown) along the edges 392 to the gate seat body 314, the sealing assembly 300 further includes first and second bridge elements 330. The first bridge element 330 is positioned along and seals with the first extension 316 and the second bridge element 330 is positioned along and seals with the second extension 318. Further, the bridge elements 330 extend between the transverse elements 306 at opposing lateral sides of the gate 304 so that the transverse elements 306 form an appropriate seal with the extensions 316, 318 via contact with the bridge elements 330. In particular, each of the bridge elements 330 extends in the opposing directions in parallel with the flow path to overlap with the associated lateral end of each of the transverse elements 306. Thus, the gate can be sealed continuously along the gate faces 390 and onto the edges 392 by the transverse elements 306, the bridge elements 330, and the seat body 314. Generally, this is similar to the configuration illustrated for the sealing assembly 200, albeit with a different sealing engagement between the respective transverse elements and bridge members. In the illustrated embodiment, the bridge elements 330 are formed from a rubber material, although other resilient material can be used in other embodiments.

Still referring to FIGS. 13 and 14, passages 332 extend through the bridge element 330 and are configured to be in fluid communication with an inner channel 326 of the transverse elements 306 and a port on an exterior of a knife gate valve body (not shown) similar to the port 182 of the knife gate valve 100 described above (see, e.g., FIG. 7). Similarly to the passages 186 (see, e.g., FIG. 7), the passages 332 allow introduction of packing material into the channels 326 of the respective transverse elements 306.

As illustrated in FIG. 14 in particular, each of the bridge elements 330 includes a through passage 334 extending in a direction parallel to the gate 104 and the first and second extensions 316, 318. In the illustrated embodiment, the seat body 314 extends through the through passage 334 of the bridge element 330 to extend between lateral ends of the first and second transverse elements 306. A interlocked sealing connection is thus created between the seat body 314 and the bridge element 230 via the passage 334, such that a complete and reliable full perimeter seal can be provided relative to the faces 390 and the edges 392 of the gate 304. In the illustrated embodiment, the bridge element 330 is distinct and separate from the seat body 314. However, other configurations are possible. For example, in some embodiments, a bridge element can be integrally formed with a seat body. Similarly, in some embodiments, a seat body may seal with a bridge element without passing through the bridge element (e.g., still interlocking or not), or a bridge element may pass through or otherwise interlock with a seat body.

Although various examples in the FIGS. illustrate configurations in which a gate seat interlocks with a transverse sealing element, or in which components of a gate seat (e.g., a gate seat body and a bridge element) interlock with each other, some embodiments may provide sealing between these or other components without an interlocking engagement. For example, some transverse seals may seal against a gate seat (e.g., a gate seat body or a bridge element) without necessarily interlocking, such as through a planar overlapping arrangement or through a butt-joint engagement. Similarly, some gate seat components, such as gate seat bodies or bridge elements, may seal against each other without necessarily interlocking, again including through a planar overlapping arrangement or through a butt-joint engagement. Generally, any variety of known arrangements for contact-seal engagement may be applied to provide these types of seals, as appropriate.

In other embodiments, as appropriate, bridge elements can be differently configured than as shown in the FIGS. For example, some bridge elements can be configured to extend laterally past lateral edges of a gate and to thereby seal with a transverse element along one or more faces of a gate rather than at or laterally to the outside of the lateral edges of the gate. As another example, some bridge elements can include structures that are configured to extend into, receive, other otherwise interlock with a transverse element (or other sealing component). And some bridge elements may be configured to sealingly engage with a free end or end portion of a gate seat body (e.g., rather than be arranged with the gate seat body extending through or otherwise past the bridge element.

Although some embodiments presented above are not shown with protrusions formed on a valve body (e.g., as in FIGS. 13 and 14), such embodiments may be modified consistent with other discussion here to provide one or more such protrusions, as appropriate. Likewise, embodiments presented above with protrusions that are received in inner areas of a transverse sealing element may in some cases be modified to exclude one or more of the protrusions.

Other variations are also possible, consistent with the general principles discussed above and the structures and functionality presented relative to specific, illustrated embodiments. In some embodiments, aspects of some of the arrangements discussed or illustrated above can be interchanged with or added to aspects of others consistent with the general scope of this disclosure. For example, the transverse elements 306 of FIGS. 13 and 14 are shown as having fully enclosed internal channels 326, in contrast to the transverse elements 114, 206 (see, e.g., FIGS. 9 and 12) that are configured with open channels. In some embodiments, a sealing assembly may be similar in many regards to the sealing assemblies 110, 200, but may include fully enclosed rather than open channels. In such an arrangement, for example, a protrusion similar to the protrusions 174 may be configured as a post to be received within such a channel. Conversely, in some embodiments, a sealing assembly may be similar in many regards to the sealing assembly 300, but may also include protrusions to support sealing engagements (e.g., configured similarly to the protrusions 174) or may include transverse elements with channels similar to the channels 126. In some embodiments, a transverse sealing element may not necessarily include any inner area (e.g., may be formed as a solid piece).

Thus, embodiments of the invention can provide an improved sealing arrangement, or valve or valve structure incorporating or enabling such a sealing arrangement, as compared to conventional approaches. For example, in some embodiments, a sealing engagement between transverse sealing elements a unitary or multi-component gate seat can provide for improved complete perimeter sealing for a gate valve, without relying on packing material to provide a sealing engagement over any portion of the perimeter.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A knife gate valve for flow along a flow path, the knife gate valve comprising:
   a body structure that includes a gate passage and defines a fluid aperture that includes the flow path;
   a gate disposed to move within the gate passage between open and closed positions to selectively open or close the fluid aperture;
   a gate seat including a U-shaped seat body that extends from a first extension on a first side of the gate passage, around a portion of the fluid aperture, to a second extension on a second side of the gate passage, the gate seat being configured to engage a free end and lateral edges of the gate to seal the fluid aperture when the gate is in the closed position;
   a first transverse element formed of resilient material, the first transverse element extending laterally across the gate passage to form a seal with a first side of the gate and with the first and second extensions of the gate seat;
   a second transverse element formed of resilient material, the second transverse element extending laterally across the gate passage to form a seal with a second side of the gate, opposite the first side relative to the flow path, and with the first and second extensions of the gate seat; and
   a first bridge element positioned along the first extension, wherein the first and second transverse elements form the respective seal with the first extension via contact with the first bridge element.

2. The knife gate valve of claim 1, wherein the gate seat includes an integrally formed seat body that includes the first and second extensions; and
   wherein each of the first and second transverse elements contacts the seat body at the first and second extensions to form the seal.

3. The knife gate valve of claim 2, wherein each of the first and second extensions is configured to form a respective extended seal with a respective one of the lateral edges of the gate;
- wherein each of the first and second extensions exhibits a narrowed portion along the extended seal, relative to a width dimension parallel to the flow path; and
- wherein the first and second transverse elements interlock with the gate seat along the narrowed portion of the first and second extensions to form the seals with the first and second extensions.

4. The knife gate valve of claim 1, wherein the first transverse element includes:
- a first contact surface configured to form the seal with the first side of the gate; and
- a first elongate channel opposite the first contact surface; and
wherein the body structure includes first and second protrusions that are seated within opposing lateral end portions of the first elongate channel.

5. The knife gate valve of claim 4, wherein the first and second protrusions are disposed within a first transverse recess of the body structure that extends laterally across the body structure and receives the first transverse element.

6. The knife gate valve of claim 4, wherein the first protrusion includes a passage that extends between a port at an exterior of the body structure and the first elongate channel and that is configured to direct packing material from the port into the first elongate channel.

7. The knife gate valve of claim 4, wherein the first and second protrusions extend within the first elongate channel from the respective lateral end portions of the first elongate channel past a respective one of the lateral edges of the gate.

8. The knife gate valve of claim 4, wherein the second transverse element includes:
- a second contact surface configured to form the seal with the second side of the gate; and
- a second elongate channel opposite the second contact surface; and
wherein the body structure includes third and fourth protrusions that are seated within opposing lateral end portions of the second elongate channel, opposite the gate from the first and second protrusions.

9. The knife gate valve of claim 1, wherein the first bridge element is formed from a rubber material.

10. The knife gate valve of claim 1, wherein the seat body extends through a passage in the first bridge element to extend along the gate between the first and second transverse elements.

11. The knife gate valve of claim 1, wherein the first bridge element extends in a direction of the flow path to overlap with at least one of the first or second transverse elements and includes a passage that is aligned for introduction of packing material, via the passage, into a channel of the at least one of the first or second transverse elements.

12. The knife gate valve of claim 1, wherein the first and second transverse elements extend laterally past a first of the lateral edges of the gate to overlap with the first bridge element.

13. The knife gate valve of claim 1, wherein the first bridge element extends, in the direction of the flow path, past a first of the lateral edges of the gate to form the seal on the first extension with at least one of the first or second transverse elements.

14. The knife gate valve of claim 1, wherein the first transverse element includes a contact surface for the gate, a channel opposite the contact surface, and a lip extending away from the channel, opposite the contact surface from the gate; and
the knife gate valve further comprising:
- a scraper body that extends along the first transverse element outside the channel and extends between the gate and the lip, wherein the lip is secured against the body structure by the scraper body.

15. A sealing assembly for a knife gate valve that includes valve bodies that define a fluid aperture and further includes a gate configured to slidably move between the valve bodies to selectively block the fluid aperture, the sealing assembly comprising:
- a gate seat that includes a U-shaped seat body configured to sealingly engage edges of the gate at the fluid aperture, with a base portion that is configured to extend around a portion of the fluid aperture, and first and second extensions on opposing sides of the base portion that are configured to extend on opposing sides of the fluid aperture;
- a first transverse element formed from rubber material and configured to sealingly engage a first face of the gate and to extend laterally across the gate to overlap with, and form a seal with, a first side of each of the first and second extensions; and
- a second transverse element formed from rubber material and configured to sealingly engage a second face of the gate and to extend laterally across the gate to overlap with, and form a seal with, a second side of each of the first and second extensions that is opposite the first side,
wherein each of the first and second transverse elements includes an elongate channel configured to extend laterally along the gate and receive, in one or more lateral end portions of the elongate channel, one or more protrusions that are formed in a respective one of the valve bodies.

16. The sealing assembly of claim 15, wherein each of the first and second transverse elements includes:
- a main body with a contact surface configured to form a seal with the first or second faces of the gate, respectively; and
- first and second lips extending from opposite sides of the main body, opposite the contact surface; and
the sealing assembly further comprising:
- first and second sets of scrapers, each of the scrapers being configured to seat against the main body of a respective one of the first or second transverse elements and against a respective one of the first or second lips of the respective first or second transverse elements, to secure the first and second lips against a respective one of the valve bodies.

17. A valve body for a knife gate valve that includes a gate, a gate seat, and a transverse element, the gate seat and the transverse element being configured to form a complete perimeter seal with the gate relative to flow through the knife gate valve, the valve body comprising:
- a seat recess configured to receive the gate seat, the seat recess extending partly around and on opposing sides of a fluid aperture defined by the valve body;
- a transverse recess that extends laterally across the valve body to overlap with the seat recess on the opposing sides of the fluid aperture; and
- a plurality of protrusions within the transverse recess, including a first protrusion at a first lateral end of the transverse recess and a second protrusion at a second lateral end of the transverse recess, each of the protrusions being configured to be inserted into a channel of the transverse element when the transverse element is received in the transverse recess.

18. The valve body of claim 17, wherein each of the first and second protrusions includes a passage that extends through the first or second protrusion and is in fluid communication with the transverse recess and a respective packing port of the valve body.

\* \* \* \* \*